United States Patent
Lee et al.

(10) Patent No.: US 9,625,761 B2
(45) Date of Patent: Apr. 18, 2017

(54) POLARIZER AND LIQUID CRYSTAL DISPLAY INCLUDING THE SAME

(71) Applicant: SAMSUNG DISPLAY CO., LTD., Yongin, Gyeonggi-Do (KR)

(72) Inventors: Dae-Young Lee, Yongin (KR); Joon Yong Park, Yongin (KR); Kyung Seop Kim, Yongin (KR); Jung Gun Nam, Yongin (KR); Chang Oh Jeong, Yongin (KR); Gug Rae Jo, Yongin (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 189 days.

(21) Appl. No.: 14/089,795

(22) Filed: Nov. 26, 2013

(65) Prior Publication Data
US 2014/0354923 A1 Dec. 4, 2014

(30) Foreign Application Priority Data
May 28, 2013 (KR) .......................... 10-2013-0060448

(51) Int. Cl.
*G02F 1/1335* (2006.01)
*G02B 1/113* (2015.01)
*G02B 5/30* (2006.01)
*B82Y 20/00* (2011.01)

(52) U.S. Cl.
CPC ........ *G02F 1/133536* (2013.01); *G02B 1/113* (2013.01); *G02B 5/3058* (2013.01); *G02F 1/133528* (2013.01); *B82Y 20/00* (2013.01); *G02F 2001/133548* (2013.01); *Y10S 977/834* (2013.01)

(58) Field of Classification Search
CPC ......... G02F 1/133528; G02F 1/133536; G02F 2001/133548; G02B 5/3033; G02B 5/3016; G02B 5/3025; G02B 5/3058; G02B 1/113; G02B 1/133528; B82Y 20/00; Y10S 977/834
USPC .......................................................... 349/96
See application file for complete search history.

(56) References Cited

U.S. PATENT DOCUMENTS

| 8,137,496 B2 | 3/2012 | Lee et al. | |
| 2008/0094547 A1* | 4/2008 | Sugita et al. | ................... 349/96 |
| 2009/0052030 A1 | 2/2009 | Kaida et al. | |

(Continued)

FOREIGN PATENT DOCUMENTS

| JP | 2009-139411 A | 6/2009 |
| KR | 10-2011-0137257 A | 12/2011 |
| KR | 10-2012-0040869 A | 4/2012 |

*Primary Examiner* — Nathanael R Briggs
*Assistant Examiner* — William Peterson
(74) *Attorney, Agent, or Firm* — Lee & Morse, P.C.

(57) ABSTRACT

A polarizer and a liquid crystal display including the polarizer, the polarizer including a plurality of metal lines extending in one direction and being arranged at regular intervals; and a plurality of low reflection layers on the plurality of metal lines, the plurality of low reflection layers contacting respective upper parts of the plurality of metal lines and having an interval and a width about equal to an interval and a width of the plurality of metal lines, wherein the interval of the plurality of metal lines is smaller than a wavelength of a visible ray, and light incident from an upper side of the plurality of low reflection layers is reflected with reflectivity equal to or smaller than 10%.

17 Claims, 30 Drawing Sheets

(56) References Cited

U.S. PATENT DOCUMENTS

| | | |
|---|---|---|
| 2011/0037928 A1* | 2/2011 | Little .............................. 349/96 |
| 2011/0285942 A1 | 11/2011 | Guo et al. |
| 2012/0183739 A1 | 7/2012 | Kim et al. |
| 2013/0120672 A1* | 5/2013 | Kumai ............................. 349/5 |
| 2014/0098330 A1* | 4/2014 | Nam et al. ..................... 349/96 |

* cited by examiner

FIG.6

| period : 100nm | | | | | | | | |
|---|---|---|---|---|---|---|---|---|
| wavelength : 550nm | | | | | | | | |
| superstrate : Glass | | | | | | | | |
| AL : 150nm | | | | | | | | |
| TiNx-AL | | | | | | | | |
| | TE | | TM | | | | | |
| TiNx thick(nm) | SumR | SumT | SumR | SumT | ER | SumT | Transmission | Reflection |
| 0 | 0.855489 | 5.65E-06 | 0.035481 | 8.51E-01 | 1.51E+05 | 0.425265 | 0.445485 |
| 10 | 0.631951 | 4.89E-06 | 0.044442 | 7.89E-01 | 1.62E+05 | 0.394742 | 0.338196 |
| 20 | 0.344453 | 3.65E-06 | 0.042427 | 7.42E-01 | 2.03E+05 | 0.371071 | 0.19344 |
| 30 | 0.151359 | 2.44E-06 | 0.03706 | 7.04E-01 | 2.88E+05 | 0.351987 | 0.094709 |
| 40 | 0.079282 | 1.58E-06 | 0.036136 | 6.69E-01 | 4.22E+05 | 0.33432 | 0.057709 |
| 50 | 0.077575 | 1.04E-06 | 0.03724 | 6.36E-01 | 6.09E+05 | 0.317933 | 0.057408 |
| 60 | 0.102897 | 7.12E-07 | 0.040763 | 6.06E-01 | 8.52E+05 | 0.303039 | 0.07183 |
| 70 | 0.132067 | 4.99E-07 | 0.045774 | 5.79E-01 | 1.16E+06 | 0.289733 | 0.08892 |
| 80 | 0.154688 | 3.57E-07 | 0.051306 | 5.56E-01 | 1.56E+06 | 0.277978 | 0.102997 |
| 90 | 0.16746 | 2.59E-07 | 0.056463 | 5.35E-01 | 2.07E+06 | 0.267644 | 0.111962 |
| 100 | 0.171215 | 1.88E-07 | 0.060481 | 5.17E-01 | 2.75E+06 | 0.258534 | 0.115848 |

FIG.10

| period : 100nm | | | | | | | |
| --- | --- | --- | --- | --- | --- | --- | --- |
| wavelength : 550nm | | | | | | | |
| superstrate : Glass | | | | | | | |
| CuNx : 10nm | | | | | | | |
| AL : 150nm | | | | | | | |
| CuNx-TiNx-AL | | | | | | | |
| | TE | | TM | | | | |
| TiNx thick(nm) | SumR | SumT | SumR | SumT | ER | Transmission | Reflection |
| 0 | 0.813152 | 4.93E-06 | 0.061536 | 0.742126 | 1.50E+05 | 0.371066 | 0.437344 |
| 10 | 0.590682 | 4.08E-06 | 0.061914 | 0.704472 | 1.73E+05 | 0.352238 | 0.326298 |
| 20 | 0.338539 | 3.01E-06 | 0.052294 | 0.666841 | 2.21E+05 | 0.333422 | 0.195416 |
| 30 | 0.173309 | 2.05E-06 | 0.040955 | 0.633243 | 3.09E+05 | 0.316623 | 0.107131 |
| 40 | 0.111692 | 1.36E-06 | 0.031897 | 0.603214 | 4.44E+05 | 0.301608 | 0.071794 |
| 50 | 0.112873 | 9.10E-07 | 0.025982 | 0.57676 | 6.34E+05 | 0.2838 | 0.069428 |
| 60 | 0.139045 | 6.25E-07 | 0.023168 | 0.553772 | 8.87E+05 | 0.276886 | 0.081106 |
| 70 | 0.168399 | 4.39E-07 | 0.023096 | 0.533936 | 1.22E+06 | 0.266968 | 0.095748 |
| 80 | 0.190825 | 3.14E-07 | 0.025249 | 0.516786 | 1.65E+06 | 0.258393 | 0.108037 |
| 90 | 0.203259 | 2.26E-07 | 0.028999 | 0.501754 | 2.22E+06 | 0.250877 | 0.116129 |
| 100 | 0.20676 | 1.64E-07 | 0.033641 | 0.488214 | 2.98E+06 | 0.244107 | 0.120201 |

FIG.11

| period : 100nm | | | | | | | |
| --- | --- | --- | --- | --- | --- | --- | --- |
| wavelength : 550nm | | | | | | | |
| superstrate : Glass | | | | | | | |
| TiNx : 40nm | | | | | | | |
| AL : 150nm | | | | | | | |
| CuNx-TiNx-AL | | | | | | | |
| | TE | | TM | | | | |
| CuNx thick(nm) | SumR | SumT | SumR | SumT | ER | Transmission | Reflection |
| 0 | 0.079284 | 1.58E-06 | 0.036213 | 0.668602 | 4.24E+05 | 0.334302 | 0.057748 |
| 10 | 0.111692 | 1.36E-06 | 0.031897 | 0.603214 | 4.44E+05 | 0.301608 | 0.071794 |
| 20 | 0.138883 | 1.16E-06 | 0.025728 | 0.562776 | 4.85E+05 | 0.281388 | 0.082306 |
| 30 | 0.159155 | 9.81E-07 | 0.017238 | 0.529715 | 5.40E+05 | 0.264858 | 0.088196 |
| 40 | 0.172189 | 8.24E-07 | 0.009403 | 0.50118 | 6.08E+05 | 0.25059 | 0.090796 |
| 50 | 0.178653 | 6.88E-07 | 0.003725 | 0.476414 | 6.92E+05 | 0.238207 | 0.091189 |
| 60 | 0.179769 | 5.72E-07 | 0.000751 | 0.454651 | 7.94E+05 | 0.227326 | 0.09026 |
| 70 | 0.176942 | 4.75E-07 | 0.000528 | 0.435122 | 9.16E+05 | 0.217561 | 0.088735 |
| 80 | 0.17152 | 3.94E-07 | 0.002786 | 0.417136 | 1.06E+06 | 0.208568 | 0.087153 |
| 90 | 0.164654 | 3.27E-07 | 0.007035 | 0.400116 | 1.23E+06 | 0.200058 | 0.085844 |
| 100 | 0.157248 | 2.71E-07 | 0.012624 | 0.383606 | 1.42E+06 | 0.191803 | 0.084936 |

FIG.14

| period : 100nm | | | | | | | |
|---|---|---|---|---|---|---|---|
| wavelength : 550nm | | | | | | | |
| superstrate : Glass | | | | | | | |
| MoNx : 50nm | | | | | | | |
| AL : 150nm | | | | | | | |
| CuNx-MoNx-AL | | | | | | | |
| | TE | | TM | | | | |
| CuNx thick(nm) | SumR | SumT | SumR | SumT | ER | Transmission | Reflection |
| 0 | 0.258335 | 4.98E-07 | 0.018871 | 6.63E-01 | 1.33E+06 | 0.331709 | 0.138603 |
| 10 | 0.284452 | 4.29E-07 | 0.014217 | 6.03E-01 | 1.41E+06 | 0.301532 | 0.149335 |
| 20 | 0.296793 | 3.62E-07 | 0.011055 | 5.73E-01 | 1.58E+06 | 0.286259 | 0.153924 |
| 30 | 0.295981 | 3.01E-07 | 0.006183 | 5.46E-01 | 1.81E+06 | 0.272791 | 0.151082 |
| 40 | 0.284912 | 2.48E-07 | 0.002182 | 5.21E-01 | 2.10E+06 | 0.260263 | 0.143547 |
| 50 | 0.267147 | 2.03E-07 | 0.000281 | 4.98E-01 | 2.45E+06 | 0.248779 | 0.133714 |
| 60 | 0.245927 | 1.66E-07 | 0.000787 | 4.76E-01 | 2.87E+06 | 0.238225 | 0.123357 |
| 70 | 0.223769 | 1.36E-07 | 0.003522 | 4.57E-01 | 3.36E+06 | 0.22837 | 0.113646 |
| 80 | 0.202419 | 1.11E-07 | 0.008019 | 4.38E-01 | 3.93E+06 | 0.218967 | 0.105219 |
| 90 | 0.182974 | 9.16E-08 | 0.013641 | 4.20E-01 | 4.58E+06 | 0.209807 | 0.098308 |
| 100 | 0.166032 | 7.56E-08 | 0.019673 | 4.01E-01 | 5.31E+06 | 0.200737 | 0.092852 |

FIG.17

| period : 100nm | | | | | | | |
|---|---|---|---|---|---|---|---|
| wavelength : 550nm | | | | | | | |
| superstrate : Glass | | | | | | | |
| Ti : 20nm | | | | | | | |
| AL : 150nm | | | | | | | |
| Ti+IZO+AL | | | | | | | |
| | TE | | TM | | | | |
| IZO thick(nm) | SumR | SumT | SumR | SumT | ER | Transmission | Reflection |
| 0 | 0.59043459 | 2.97E-06 | 0.031752922 | 7.31E-01 | 2.46E+05 | 0.365470518 | 0.311093756 |
| 10 | 0.470050426 | 2.37E-06 | 0.023329522 | 6.49E-01 | 2.74E+05 | 0.324655708 | 0.246689974 |
| 20 | 0.366524654 | 1.99E-06 | 0.017952178 | 5.98E-01 | 3.00E+05 | 0.298993224 | 0.192238416 |
| 30 | 0.277967144 | 1.78E-06 | 0.017331015 | 5.69E-01 | 3.19E+05 | 0.284300511 | 0.147649079 |
| 40 | 0.201836035 | 1.68E-06 | 0.02014336 | 5.47E-01 | 3.26E+05 | 0.273457692 | 0.110989697 |
| 50 | 0.136414122 | 1.66E-06 | 0.02598429 | 5.31E-01 | 3.20E+05 | 0.265501796 | 0.081199206 |
| 60 | 0.081336749 | 1.73E-06 | 0.034443117 | 5.20E-01 | 3.01E+05 | 0.260223822 | 0.057889933 |
| 70 | 0.038199809 | 1.88E-06 | 0.044986066 | 5.15E-01 | 2.74E+05 | 0.257560258 | 0.041592938 |
| 80 | 0.001717437 | 2.15E-06 | 0.056993427 | 5.15E-01 | 2.40E+05 | 0.257481177 | 0.034355432 |
| 90 | 0.011785048 | 2.55E-06 | 0.069788656 | 5.20E-01 | 2.04E+05 | 0.259944318 | 0.040786852 |
| 100 | 0.056124786 | 3.13E-06 | 0.082636837 | 5.30E-01 | 1.69E+05 | 0.26486105 | 0.069380811 |

FIG.20

| period : 100nm | | | | | | | |
| --- | --- | --- | --- | --- | --- | --- | --- |
| wavelength : 550nm | | | | | | | |
| superstrate : Glass | | | | | | | |
| Ti : 30nm | | | | | | | |
| AL : 150nm | | | | | | | |
| Ti+IZO+AL | | | | | | | |
| | TE | | TM | | | | |
| IZO thick(nm) | SumR | SumT | SumR | SumT | ER | Transmission | Reflection |
| 0 | 0.472862375 | 1.97E-06 | 0.022036589 | 6.94E-01 | 3.53E+05 | 0.346807086 | 0.247449482 |
| 10 | 0.377628329 | 1.52E-06 | 0.012144115 | 5.95E-01 | 3.93E+05 | 0.297709153 | 0.194886222 |
| 20 | 0.300164178 | 1.26E-06 | 0.011771291 | 5.59E-01 | 4.44E+05 | 0.279289983 | 0.155967734 |
| 30 | 0.235283029 | 1.12E-06 | 0.015911839 | 5.37E-01 | 4.81E+05 | 0.268572236 | 0.125597434 |
| 40 | 0.17943368 | 1.05E-06 | 0.023345926 | 5.20E-01 | 4.93E+05 | 0.259774362 | 0.101389803 |
| 50 | 0.130446895 | 1.06E-06 | 0.033657509 | 5.06E-01 | 4.80E+05 | 0.253100034 | 0.082052202 |
| 60 | 0.08740314 | 1.12E-06 | 0.046224918 | 4.98E-01 | 4.46E+05 | 0.248780665 | 0.066814016 |
| 70 | 0.050921237 | 1.25E-06 | 0.060290034 | 4.94E-01 | 3.96E+05 | 0.246933442 | 0.055605636 |
| 80 | 0.024206686 | 1.47E-06 | 0.075041998 | 4.95E-01 | 3.36E+05 | 0.24760957 | 0.049624342 |
| 90 | 0.015507875 | 1.84E-06 | 0.089642805 | 5.02E-01 | 2.72E+05 | 0.250805501 | 0.05262534 |
| 100 | 0.043824134 | 2.42E-06 | 0.103213535 | 5.13E-01 | 2.12E+05 | 0.25644944 | 0.073518834 |

FIG.23

| period : 100nm | | | | | | | | |
|---|---|---|---|---|---|---|---|---|
| wavelength : 550nm | | | | | | | | |
| superstrate : Glass | | | | | | | | |
| Ti : 20nm | | | | | | | | |
| AL : 150nm | | | | | | | | |
| Ti+TiOx+AL | | | | | | | | |
| | TE | | TM | | | | | |
| TiOx thick(nm) | SumR | SumT | SumR | SumT | ER | Transmission | Reflection |
| 0 | 0.59043459 | 2.97E-06 | 0.031752922 | 7.31E-01 | 2.46E+05 | 0.355470518 | 0.311093756 |
| 10 | 0.461650895 | 2.42E-06 | 0.024386015 | 6.64E-01 | 2.74E+05 | 0.331844279 | 0.243018455 |
| 20 | 0.345937419 | 2.12E-06 | 0.018948106 | 6.01E-01 | 2.84E+05 | 0.300740777 | 0.182442762 |
| 30 | 0.242930354 | 2.00E-06 | 0.018822874 | 5.70E-01 | 2.85E+05 | 0.285024106 | 0.130876614 |
| 40 | 0.152321968 | 2.02E-06 | 0.022384826 | 5.51E-01 | 2.73E+05 | 0.275538475 | 0.087453397 |
| 50 | 0.076328827 | 2.17E-06 | 0.029655654 | 5.39E-01 | 2.48E+05 | 0.269648525 | 0.050992241 |
| 60 | 0.022417794 | 2.48E-06 | 0.039610917 | 5.35E-01 | 2.15E+05 | 0.266657048 | 0.031014428 |
| 70 | 0.00785562 | 2.99E-06 | 0.051889529 | 0.53265693 | 1.78E+05 | 0.266329961 | 0.029872574 |
| 80 | 0.064889319 | 3.72E-06 | 0.06577362 | 0.537079937 | 1.44E+05 | 0.268541828 | 0.066531469 |
| 90 | 0.232847009 | 4.57E-06 | 0.080404307 | 0.546301641 | 1.20E+05 | 0.273153105 | 0.156625658 |
| 100 | 0.502362004 | 5.17E-06 | 0.094783856 | 0.559876252 | 1.08E+05 | 0.279940711 | 0.29857293 |

FIG.26

| period : 100nm | | | | | | | | | |
|---|---|---|---|---|---|---|---|---|---|
| wavelength : 550nm | | | | | | | | | |
| superstrate : Glass | | | | | | | | | |
| Ti : 30nm | | | | | | | | | |
| AL : 150nm | | | | | | | | | |
| Ti+TiOx+AL | | | | | | | | | |
| | TE | | | TM | | | | | |
| TiOx thick(nm) | SumR | SumT | SumR | SumT | ER | Transmission | Reflection |
| 0 | 0.472862375 | 1.97E-06 | 0.022036589 | 0.693612207 | 3.53E+05 | 0.346807086 | 0.247449482 |
| 10 | 0.37181977 | 1.55E-06 | 0.012659726 | 0.607674259 | 3.92E+05 | 0.303837904 | 0.192239748 |
| 20 | 0.286146861 | 1.34E-06 | 0.01107994 | 0.549183783 | 4.11E+05 | 0.274592559 | 0.148613401 |
| 30 | 0.211302462 | 1.25E-06 | 0.01576416 | 0.52562123 | 4.19E+05 | 0.262811242 | 0.113533311 |
| 40 | 0.144651214 | 1.28E-06 | 0.024129265 | 0.511485304 | 4.00E+05 | 0.255743291 | 0.08439024 |
| 50 | 0.085935374 | 1.41E-06 | 0.035596145 | 0.502829707 | 3.58E+05 | 0.251415556 | 0.06076576 |
| 60 | 0.038990518 | 1.67E-06 | 0.04956982 | 0.499211561 | 2.99E+05 | 0.249606616 | 0.044280169 |
| 70 | 0.016522182 | 2.14E-06 | 0.065255297 | 0.500607644 | 2.34E+05 | 0.25030489 | 0.040093874 |
| 80 | 0.051447908 | 2.90E-06 | 0.081708828 | 0.506974526 | 1.75E+05 | 0.253488711 | 0.066578368 |
| 90 | 0.204685413 | 3.96E-06 | 0.097865295 | 0.518128131 | 1.31E+05 | 0.259066045 | 0.151275354 |
| 100 | 0.499040245 | 4.82E-06 | 0.112536692 | 0.533647436 | 1.11E+05 | 0.266826127 | 0.305788468 |

FIG.27

| Item | Film formation material |
|---|---|
| Oxide | AlOx, TiOx, MoOx, CuOx, SiOx |
| Nitride | AlNx, TiNx, SiNx, CuNx, MoNx |
| TCO | GZO(two types), IZO(two types), ITO, ZAO |
| Metal | Ti |

FIG.28

| Item | Material | 450nm | | 550nm | | 630nm | | AVG. | |
|---|---|---|---|---|---|---|---|---|---|
| | | n | k | n | k | n | k | n | k |
| Metal | Ti | 1.81 | 1.56E+00 | 2.03 | 1.72E+00 | 2.17 | 1.85E+00 | 2.17 | 1.81E+00 |
| Oxide | AlOx | 1.63 | 4.21E-04 | 1.62 | 3.27E-04 | 1.61 | 2.84E-04 | 1.62 | 3.33E-04 |
| | TiOx | 2.38 | 0.00E+00 | 2.24 | 0.00E+00 | 2.18 | 0.00E+00 | 2.26 | 0.00E+00 |
| | MoOx | 2.25 | 1.20E-02 | 2.17 | 1.80E-03 | 2.13 | 6.13E-04 | 2.20 | 8.21E-02 |
| | CuOx | 2.39 | 5.91E-01 | 2.46 | 4.11E-01 | 2.48 | 2.95E-01 | 2.30 | 2.39E-01 |
| | SiOx | 1.48 | 0.00E+00 | 1.47 | 0.00E+00 | 1.47 | 0.00E+00 | 1.47 | 0.00E+00 |
| Nitride | AlNx | 2.20 | 0.00E+00 | 2.17 | 0.00E+00 | 2.16 | 0.00E+00 | 2.22 | 0.00E+00 |
| | TiNx | 3.29 | 1.79E+00 | 3.01 | 1.97E+00 | 2.83 | 2.32E+00 | 3.01 | 2.68E+00 |
| | CuNx | 1.24 | 1.29E+00 | 1.27 | 1.42E+00 | 1.25 | 1.62E+00 | 1.27 | 1.64E+00 |
| | MoNx | 2.93 | 2.93E+00 | 3.15 | 3.08E+00 | 3.29 | 3.36E+00 | 3.04 | 3.23E+00 |
| | SiNx | 1.86 | 0.00E+00 | 1.85 | 0.00E+00 | 1.84 | 0.00E+00 | 1.89 | 0.00E+00 |
| Nitride | IZO_10% | 2.13 | 1.29E-02 | 1.99 | 3.82E-03 | 1.91 | 1.92E-03 | 1.95 | 2.01E-02 |
| | IZO_70% | 1.97 | 1.21E-02 | 1.88 | 4.75E-03 | 1.82 | 2.80E-03 | 1.84 | 1.07E-02 |
| | ITO | 1.89 | 1.47E-02 | 1.70 | 1.44E-02 | 1.58 | 1.42E-02 | 1.69 | 1.44E-02 |
| | GZO_11.8% | 1.95 | 3.15E-03 | 1.83 | 5.28E-04 | 1.76 | 1.92E-04 | 1.81 | 1.26E-02 |
| | GZO_20.4% | 1.99 | 4.79E-03 | 1.91 | 1.02E-03 | 1.86 | 4.26E-04 | 1.89 | 1.17E-02 |
| | ZAO | 1.97 | 1.00E-02 | 1.86 | 2.35E-03 | 1.79 | 1.03E-03 | 1.82 | 2.36E-02 |

POLARIZER AND LIQUID CRYSTAL DISPLAY INCLUDING THE SAME

CROSS-REFERENCE TO RELATED APPLICATION

Korean Patent Application No. 10-2013-0060448, filed on May 28, 2013, in the Korean Intellectual Property Office, and entitled: "Polarizer and Liquid Crystal Display Having the Same," is incorporated by reference herein in its entirety.

BACKGROUND

1. Field

Embodiments relate to a polarizer and a liquid crystal display including the same.

2. Description of the Related Art

A liquid crystal display is a flat panel display that is widely used, and may include two display panels on which electric field generating electrodes such as a pixel electrode and a common electrode are formed and a liquid crystal layer inserted between the two display panels. The liquid crystal display may apply a voltage to the electric field generating electrodes to generate an electric field in the liquid crystal layer, may determine orientations of liquid crystal molecules of the liquid crystal layer, and may control polarization of incident light, so as to display an image through the generated electric field.

The above information disclosed in this Background section is only for enhancement of understanding of the background of the invention and therefore it may contain information that does not form the prior art that is already known in this country to a person of ordinary skill in the art.

SUMMARY

Embodiments are directed to a polarizer and a liquid crystal display including the same The embodiments may be realized by providing a polarizer including a plurality of metal lines extending in one direction and being arranged at regular intervals; and a plurality of low reflection layers on the plurality of metal lines, the plurality of low reflection layers contacting respective upper parts of the plurality of metal lines and having an interval and a width about equal to an interval and a width of the plurality of metal lines, wherein the interval of the plurality of metal lines is smaller than a wavelength of a visible ray, and light incident from an upper side of the plurality of low reflection layers is reflected with reflectivity equal to or smaller than 10%.

The low reflection layer may be a single layer, the single layer may include a nitride, the nitride including one of AlNx, TiNx, SiNx, CuNx, or MoNx.

The metal line may include aluminum and may have a height of about 150 nm to about 200 nm, and the low reflection layer may have a height of about 40 nm to about 70 nm.

The low reflection layer may be a dual layer, and the dual layer may include a first low reflection layer contacting an upper part of the metal line and a second low reflection layer contacting an upper part of the first low reflection layer.

The first low reflection layer and the second low reflection layer may each include a nitride, the nitride including AlNx, TiNx, SiNx, CuNx, or MoNx, and the nitride of the first low reflection layer may be different from the nitride of the second low reflection layer.

The metal line may include aluminum and may have a height of about 150 nm to about 200 nm, the first low reflection layer may include TiNx and may have a height of about 40 nm to about 70 nm, and the second low reflection layer may include CuNx and may have a height of about 10 nm to about 100 nm.

The metal line may include aluminum and may have a height of about 150 nm to about 200 nm, the first low reflection layer may include MoNx and may have a height of about 10 nm to about 100 nm, and the second low reflection layer may include CuNx and may have a height of about 80 nm to about 100 nm.

The first low reflection layer may include a transparent conductive material, the transparent conductive material including GZO, IZO, ITO, or AZO, and the second low reflection layer may include a metal, the metal including Ti.

The metal line may include aluminum and may have a height of about 150 nm to about 200 nm, the first low reflection layer may have a height of about 50 nm to about 100 nm, and the second low reflection layer may have a height of about 10 nm to about 40 nm.

The first low reflection layer may include an oxide, the oxide including AlOx, TiOx, MoOx, CuOx, or SiOx, and the second low reflection layer may include a metal, the metal including Ti.

The metal line may include aluminum and may have a height of about 150 nm to about 200 nm, the first low reflection layer may have a height of about 40 nm to about 80 nm, and the second low reflection layer may have a height of about 20 nm to about 40 nm.

The embodiments may also be realized by providing a liquid crystal display including a lower display panel including a lower insulation substrate and a lower polarizer attached to one side of the lower insulation substrate; an upper display panel including an upper insulation substrate and an upper polarizer attached to one side of the upper insulation substrate; and a liquid crystal layer between the upper display panel and the lower display panel, wherein the upper polarizer includes a plurality of metal lines extending in one direction and being arranged at regular intervals; and a plurality of low reflection layers on the plurality of metal lines, the plurality of low reflection layers contacting respective upper parts of the plurality of metal lines and having an interval and a width equal to an interval and a width of the plurality of metal lines, an interval of the plurality of metal lines is smaller than a wavelength of a visible ray, and light incident from an upper side of the plurality of low reflection layers is reflected with reflectivity equal to or smaller than 10%.

The low reflection layer may be a single layer, the single layer may include a nitride, the nitride including one of AlNx, TiNx, SiNx, CuNx, or MoNx.

The metal line may include aluminum and may have a height of about 150 nm to about 200 nm, and the low reflection layer may have a height of about 40 nm to about 70 nm.

The low reflection layer may be a dual layer, and the dual layer may include a first low reflection layer contacting an upper part of the metal line and a second low reflection layer contacting an upper part of the first low reflection layer.

The first low reflection layer and the second low reflection layer may each include a nitride, the nitride including AlNx, TiNx, SiNx, CuNx, or MoNx, and the nitride of the first low reflection layer may be different from the nitride of the second low reflection layer.

The metal line may include aluminum and may have a height of about 150 nm to about 200 nm, the first low reflection layer may include TiNx and may have a height of about 40 nm to about 70 nm, and the second low reflection layer may include CuNx and may have a height of about 10 nm to about 100 nm.

The metal line may include aluminum and may have a height of about 150 nm to about 200 nm, the first low reflection layer may include MoNx and may have a height of about 10 nm to about 100 nm, and the second low reflection layer may include CuNx and may have a height of about 80 nm to about 100 nm.

The first low reflection layer may include a transparent conductive material, the transparent conductive material including GZO, IZO, ITO, or AZO, and the second low reflection layer may include a metal, the metal including Ti.

The metal line may include aluminum and may have a height of about 150 nm to about 200 nm, the first low reflection layer may have a height of about 50 nm to about 100 nm, and the second low reflection layer may have a height of about 10 nm to about 40 nm.

The first low reflection layer may include an oxide, the oxide including AlOx, TiOx, MoOx, CuOx, or SiOx, and the second low reflection layer may include a metal, the metal including Ti.

The metal line may include aluminum and may have a height of about 150 nm to about 200 nm, the first low reflection layer may have a height of about 40 nm to about 80 nm, and the second low reflection layer may have a height of about 20 nm to about 40 nm.

The lower polarizer may include a plurality of metal lines extending in one direction and being arranged at regular intervals.

BRIEF DESCRIPTION OF THE DRAWINGS

Features will be apparent to those of skill in the art by describing in detail exemplary embodiments with reference to the attached drawings in which:

FIGS. 3 to 6 illustrate graphs showing characteristics of a polarizer according to an exemplary embodiment.

FIGS. 8 to 26 illustrate graphs and tables showing characteristics of a polarizer according to an exemplary embodiment.

FIGS. 27 and 28 illustrate examples of materials used for forming a polarizer and characteristics thereof according to an exemplary embodiment.

DETAILED DESCRIPTION

Figure 1:
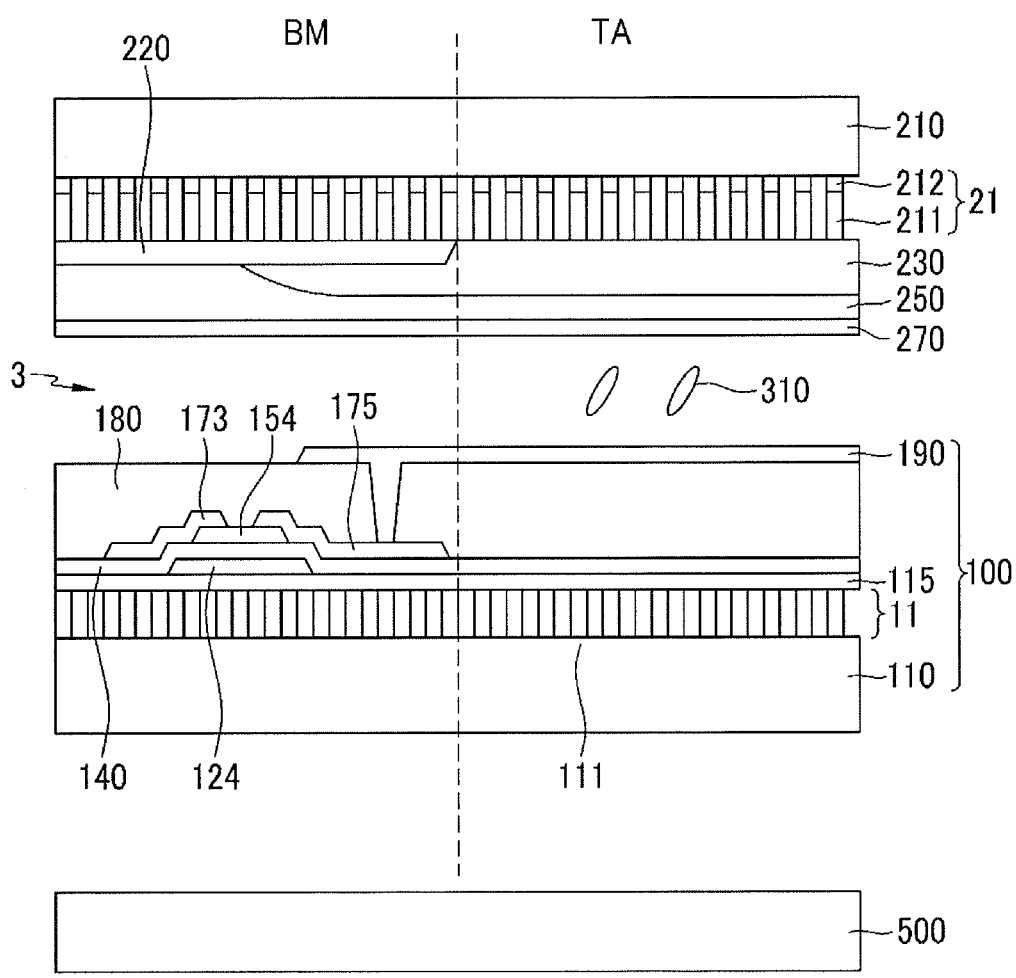
FIG. 1 illustrates a cross-sectional view of a liquid crystal display according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Hereinafter, a liquid crystal display according to an exemplary embodiment will be described in detail with reference to FIG. 1. FIG. 1 illustrates a cross-sectional view of a liquid crystal display according to an exemplary embodiment.

A liquid crystal display according to an exemplary embodiment may include a backlight unit 500 and a liquid crystal panel.

The backlight unit 500 may include a light source, a light guide, a reflector, and an optical sheet, which are just integrally illustrated in FIG. 1. Light provided by the light source may be directed to the liquid crystal panel in an upper side through the light guide, the reflector, and the optical sheet. According to an exemplary embodiment, the optical sheet may not include a luminance improving film generated by depositing two layers having different refractive indexes. The luminance improving film may not be included when a lower polarizer 11 used in the liquid crystal panel is a reflective polarizer, like the exemplary embodiment of FIG. 1, and not an absorptive polarizer.

The liquid crystal panel may include a liquid crystal layer 3, a lower display panel 100, and an upper display panel 200 as illustrated in FIG. 1.

First, the lower display panel 100 will be described.

A lower polarizer 11 may be formed on a lower insulation substrate 110. The lower insulation substrate 110 may be made of a transparent glass or plastic.

The lower polarizer 11 may be a reflective polarizer, and may include a plurality of metal lines 111.

The plurality of metal lines 111 may extend in one direction and may be separated from each other at or by regular intervals. The interval of or between the metal lines 111 may be smaller than a wavelength of a visible ray and may have a width of tens to hundreds of nm. A width of the metal line 111 may vary and may correspond to an interval between the metal lines 111 in the present exemplary embodiment. A height of the metal line 111 may vary depending on a material forming the metal line 111. The height of the metal line 111 may be, e.g., tens to hundreds of nm. In an implementation, the height of the metal line 111 may be about triple the width of the metal line 111. In an implementation, the metal line 111 may include aluminum (Al) or silver (Ag). As described above, when the plurality of metal lines 111 is arranged in one direction, the metal lines 111 may transmit the light perpendicular to the arrangement direction and may reflect the light parallel to the arrangement direction. In an implementation, the width of the metal line 111 may be 50 nm, the interval may be 50 nm, and the height of the metal line 111 may be 150 nm. In an implementation, the height of the metal line 111 may be equal to or larger than 150 nm and equal to or smaller than 200 nm, e.g., may be about 150 nm to about 200 nm.

Parts or regions between the plurality of metal lines 111 may be filled with air, or may be filled with a transparent material having a refractive index similar to that of air, according to an exemplary embodiment.

An opposing insulating layer 115 (covering the plurality of metal lines 111 and the intervals between the metal lines 111) may be formed on the lower polarizer 11. The opposing insulating layer 115 may serve as a layer for supporting formation of a thin film transistor and wiring thereon.

The plurality of metal lines 111 may be attached to the opposing insulating layer 115 and the lower insulation substrate 110 without a separate resin.

FIG. 1 illustrates an exemplary embodiment in which the lower polarizer 11 is formed in an in-cell type on an upper part of the lower insulation substrate 110.

In an implementation, the lower polarizer 11 may be formed in an on-cell type under the lower insulation substrate 110, as opposed to the lower polarizer 11 of FIG. 1. For example, the lower polarizer 11 may be formed in an external side of the lower insulation substrate 110, and the opposing insulating layer 115 may be formed under the metal lines 111 to cover and/or protect the plurality of metal lines 111 of the lower polarizer 11.

In an implementation, the lower polarizer 11 may be an absorptive polarizer that absorbs light of polarization at one side, and transmits only light of polarization perpendicular to the lower polarizer 11.

Referring back to FIG. 1, a thin film transistor and a pixel electrode may be formed on the opposing insulating layer 115 of the lower display panel 100. The thin film transistor and the pixel electrode may be formed in various structures according to an exemplary embodiment, and the following description will be made based on a simple structure thereof.

A gate line and a gate electrode 124 (receiving a gate voltage from the gate line) may be formed on the opposing insulating layer 115. The gate line may extend in a horizontal direction, and the gate electrode 124 may protrude from the gate line.

A gate insulating layer 140 made of silicon nitride (SiNx) or silicon oxide (SiOx) may be formed on the gate line and the gate electrode 124.

A semiconductor 154 made of hydrogenated amorphous silicon (also referred to as a-Si) or polysilicon may be formed on the gate insulating layer 140. The semiconductor 154 may be formed on the gate electrode 124 and may form a channel of the thin film transistor.

A plurality of data lines and a plurality of drain electrodes 175 may be formed on the semiconductor 154 and the gate insulating layer 140.

The data line may transmit a data voltage and may extend in a vertical line or direction to cross the gate line. Each of the data lines may include a plurality of source electrodes 173 extending to the gate electrode 124. The drain electrode 175 may be separated from the data line and may face the source electrode 173 based on the gate electrode 124.

One gate electrode 124, one source electrode 173, and one drain electrode 175 may form one thin film transistor (TFT), together with the semiconductor 154, and the channel of the thin film transistor may be formed on the semiconductor 154 between the source electrode 173 and the drain electrode 175.

A plurality of ohmic contacts may be formed on the semiconductor 154 and between the source electrode 173 and the drain electrode 175.

A passivation layer 180 may be formed on the data line, the drain electrode 175, and an exposed part of the semiconductor 154. The passivation layer 180 may be made of an inorganic insulator or organic insulator, and a surface thereof may be flat.

Examples of the inorganic insulator may include silicon nitride and silicon oxide. The organic insulator may have photosensitivity, and a dielectric constant thereof may be equal to or smaller than about 4.0. Further, the passivation layer 180 may have a dual-layer structure including a lower inorganic layer and an upper organic layer.

A contact hole exposing one end of the drain electrode 175 may be formed on the passivation layer 180.

A plurality of pixel electrodes 190 may be formed on the passivation layer 180. The pixel electrode 190 may be made of a transparent conductive material, e.g., ITO or IZO.

The pixel electrode 190 may be physically or electrically connected with the drain electrode 175 through the contact hole of the passivation layer 180, and may receive a data voltage from the drain electrode 175. The pixel electrode 190 (receiving the data voltage) may generate an electric field together with a common electrode 270 (receiving a common voltage) to determine a direction of a liquid crystal molecule 310 of the liquid crystal layer 3 between the two electrodes 190 and 270. According to the direction of the liquid crystal molecule determined as described above, polarization of the light passing through the liquid crystal layer 3 may be changed. The pixel electrode 190 and the common electrode 270 may form a capacitor (hereinafter, referred to as a "liquid crystal capacitor") to maintain the received voltage after the thin film transistor is turned off.

An alignment layer may be formed on the pixel electrode 190.

Hereinafter, the upper display panel 200 will be described.

An upper polarizer 21 may be formed under an upper insulation substrate 210. The an upper insulation substrate 210 may be made of a transparent glass or plastic.

The upper polarizer 21 may be a reflective polarizer, and may include a plurality of metal lines 211 and a plurality of low reflection layers 212 deposited and located on an upper part of each of the metal lines 211.

The upper polarizer 21 may be a reflective polarizer that reflects some light provided by the backlight unit 500 and transmits the remaining light. Meanwhile, reflectivity of the light having passed through the upper insulation substrate 210 to be incident from the outside may be lowered to a value equal to or smaller than 10%.

The plurality of metal lines 211 may extend in one direction and may be separated from each other at regular intervals. The interval of the metal lines 211 may be smaller than a wavelength of a visible ray, and may have a width of tens to hundreds of nm. A direction in which the plurality of metal lines 211 of the upper polarizer 21 extends and a direction in which the plurality of metal lines 111 of the lower polarizer 11 extends may be the same in an exemplary embodiment, e.g., as shown FIG. 1. However, in an implementation, the directions may have an angle of 90 degrees or a different angle.

The width of the metal line 211 may vary and may correspond to the interval between the metal lines 211 in the present exemplary embodiment. A height of the metal line 211 may be changed according to a material of the metal line 211. The height of the metal line 211 may be, e.g., tens to hundreds of nm. In an implementation, the height of the metal line 211 may be about triple the width of the metal line 211. In an implementation, the metal line 211 may include aluminum (Al). As described above, when the plurality of metal lines 211 is arranged in one direction, the metal lines 211 may transmit the light perpendicular to the arrangement direction and may reflect the light parallel to the arrangement direction. In an implementation, the width of the metal line 211 may be about 50 nm, an interval may be about 50 nm, and the height may be about 150 nm. In an implementation, the height of the metal line 211 may be equal to or larger than 150 nm and equal to or smaller than 200 nm, e.g., may be about 150 nm to about 200 nm. When the plurality of metal lines 211 is arranged in one direction, light perpendicular to the direction may be transmitted and light parallel to the direction may be reflected.

The low reflection layer 212 may be deposited on each of the plurality of metal lines 211. The low reflection layer 212 may contact an upper part of a respective metal line 211 and may have a same width and interval as those of the metal line 211. A height of the low reflection layer 212 may vary depending on a material of the low reflection layer 212, which will be described in detail with reference to FIG. 5. In an implementation, the width of the low reflection layer 212 may be about 50 nm and an interval may be about 50 nm. The low reflection layer 212 may include a nitride or metal nitride. Examples of the nitride or metal nitride may include AlNx, TiNx, SiNx, CuNx, MoNx, and the like. The low reflection layer 212 may contact only the upper part of the metal line 211, and may not be formed on a side surface of the metal line 211, so that the low reflection layer 212 may not cover both the side surface and the upper part of the metal line 211. Such an arrangement may help prevent a deterioration in an effect of reflection polarization performed by the metal line 211.

Parts or regions between the plurality of metal lines 111 and between the plurality of row reflection layers 212 may be filled with air, or may be filled with a transparent material having a refractive index similar to that of air, according to an exemplary embodiment.

The plurality of metal lines 211 and the plurality of low reflection layers 212 may directly contact the upper insulation substrate 210 and a layer under the metal lines 211 and the low reflection layers 212. For example, the plurality of metal lines 211 and the plurality of low reflection layers 212 may not adhere to an adjacent substrate or layer through the use of separate resin, thereby reducing optical loss.

In an implementation, the upper polarizer 21 illustrated in FIG. 1 may be formed on a lower part of the upper insulation substrate 210 in an in cell type.

In another implementation, the upper polarizer 21 may be formed on the upper insulation substrate 210 in an on cell type unlike the upper polarizer 21 of FIG. 1, which will be described below with reference to FIG. 30.

Although not illustrated in FIG. 1, a separate opposing insulating layer may be included in lower parts of the plurality of metal lines 211. The opposing insulating layer may help prevent the plurality of metal lines 211 from directly contacting a lower layer (a light blocking member 220, a color filter 230, or the like), and thus may help protect the plurality of metal lines 211 during a manufacturing process.

The light blocking member 220, the color filter 230, and the common electrode 270 may be formed under the upper polarizer 21. In an implementation, at least one of the light blocking member 220, the color filter 230, and the common electrode 270 may be formed on the lower display panel 100, and all of them may be formed on the lower display panel 100. A structure below the upper polarizer 21 of the upper display panel 200 of FIG. 1 is as follows.

The light blocking member 220 may be formed under the upper polarizer 21. The light blocking member 220 may also be called a black matrix and may help reduce and/or prevent light leakage. The light blocking member 220 may face the pixel electrode 190, and may be formed in a part or region corresponding to the gate line and the data line and a part or region corresponding to the thin film transistor to help reduce and/or prevent light leakage between the pixel electrodes 190. The light blocking member 220 may have an opening (indicated as TA in FIG. 1) in a part or region corresponding to the pixel electrode 190.

A plurality of color filters 230 may be formed under the upper polarizer 21 and the light blocking member 220. The color filters 230 may cover the opening of the light blocking member 220 and may extend long in a vertical direction. Each of the color filters 230 may indicate one of the primary colors, e.g., primary colors including red, green and blue.

An overcoat 250 may be formed under the color filters 230 and the light blocking member 220. The overcoat 250 may be made of an organic insulator, and may help prevent the color filters 230 from being exposed and may provide a flat surface. In an implementation, the overcoat 250 may be omitted.

The common electrode 270 may be formed under the overcoat 250. The common electrode 270 may be made of a transparent conductor, e.g., ITO, IZO, or the like.

An alignment layer may be formed under the common electrode 270.

The liquid crystal layer 3 may be formed between the upper display panel 200 and the lower display panel 100. The liquid crystal layer 3 may include a liquid crystal molecule 310 having dielectric anisotropy. A long axis of the liquid crystal molecule 310 may be perpendicular to or parallel to surfaces of the two display panels 100 and 200 in a state where there is no electric field. An alignment direction of the liquid crystal molecule 310 may be changed by the electric field generated by the pixel electrode 190 and the common electrode 270.

Hereinafter, a structure of the upper polarizer 21 according to an exemplary embodiment will be described in detail with reference to FIG. 2.

Figure 2:
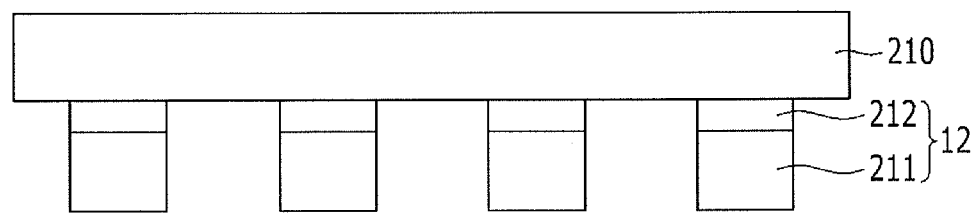
FIG. 2 illustrates an enlarged cross-sectional view of a polarizer according to an exemplary embodiment.

FIG. 2 illustrates an enlarged cross-sectional view of the polarizer according to an exemplary embodiment. For example, and the upper polarizer 21 and the upper insulation substrate 210 are illustrated in FIG. 2.

The upper polarizer 21 may be located in an inner side of the upper insulation substrate 210 located in an outer side.

The upper polarizer 21 may include the plurality of metal lines 211 and may be formed of a metal, e.g., Al. The plurality of metal lines 211 formed of Al may reflect light incident from the outside with reflectivity of about 45%. As described above, when the reflectivity is large, the user may have a difficulty in viewing an image of the display device due to an external environment (see FIG. 29). Accordingly, the embodiments may reduce the reflectivity of the upper polarizer 21 to 10% or smaller by adding the low reflection layer 212.

The low reflection layer 212 in an exemplary embodiment of FIG. 1 may include a nitride or a metal nitride. Examples of the nitride or metal nitride may include AlNx, TiNx, SiNx, CuNx, MoNx, and the like.

A width and an interval of the metal line 211 may be the same as those of the low reflection layer 212. Although not illustrated in lower parts of the metal lines 211, a separate opposing insulating layer or film may be formed to protect the metal lines 211. The metal lines 211 and the opposing insulating layer may directly contact without a separate layer (such as resin) to help improve optical efficiency.

The low reflection layer 212 may directly contact upper parts of the metal lines 211. An upper surface of the low reflection layer 212 may directly contact the upper insulation substrate 210 (without a separate layer such as resin) to help improve optical efficiency.

In an implementation, a height of the low reflection layer 212 (to allow reflectivity of the upper polarizer 21 to be 10% or smaller) will be described with reference to FIGS. 3 to 6.

FIGS. 3 to 6 illustrate graphs showing characteristics of the polarizer according to an exemplary embodiment.

As illustrated in FIG. 6, values in FIGS. 3 to 6 were generated through an experiment under the following conditions.

In an exemplary embodiment in which the metal lines 211 were formed of Al and the low reflection layer 212 was formed of TiNx, an experiment was performed for a wavelength of 550 nm when a period (sum of the width and the interval) of the metal line 211 and the low reflection layer 212 was 100 nm and a height of the metal line 211 was 150 nm.

Figure 3:
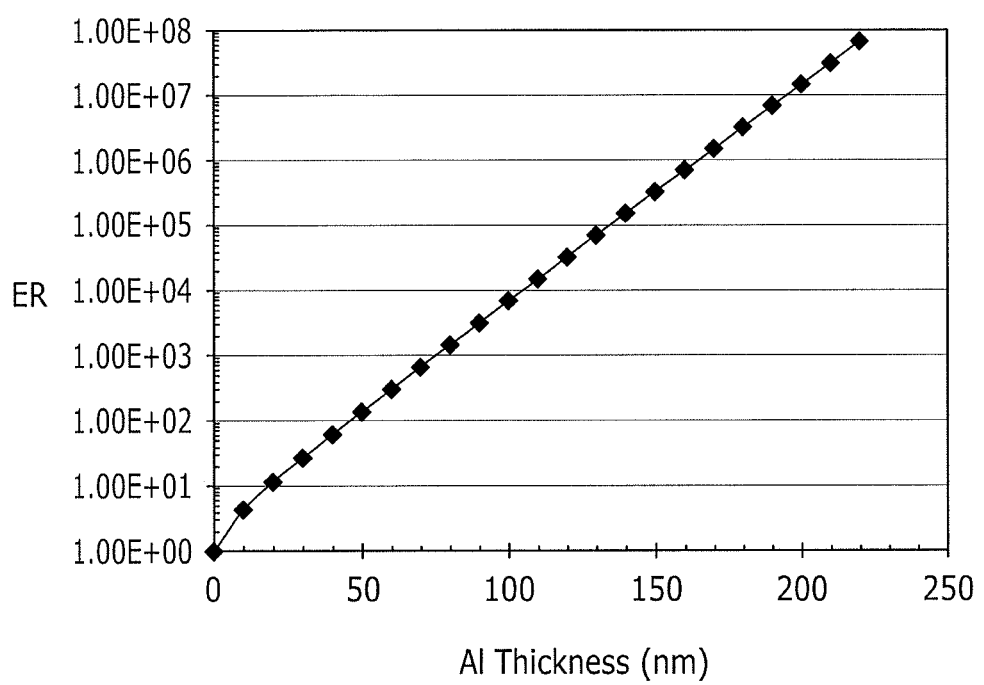
Figure 4:
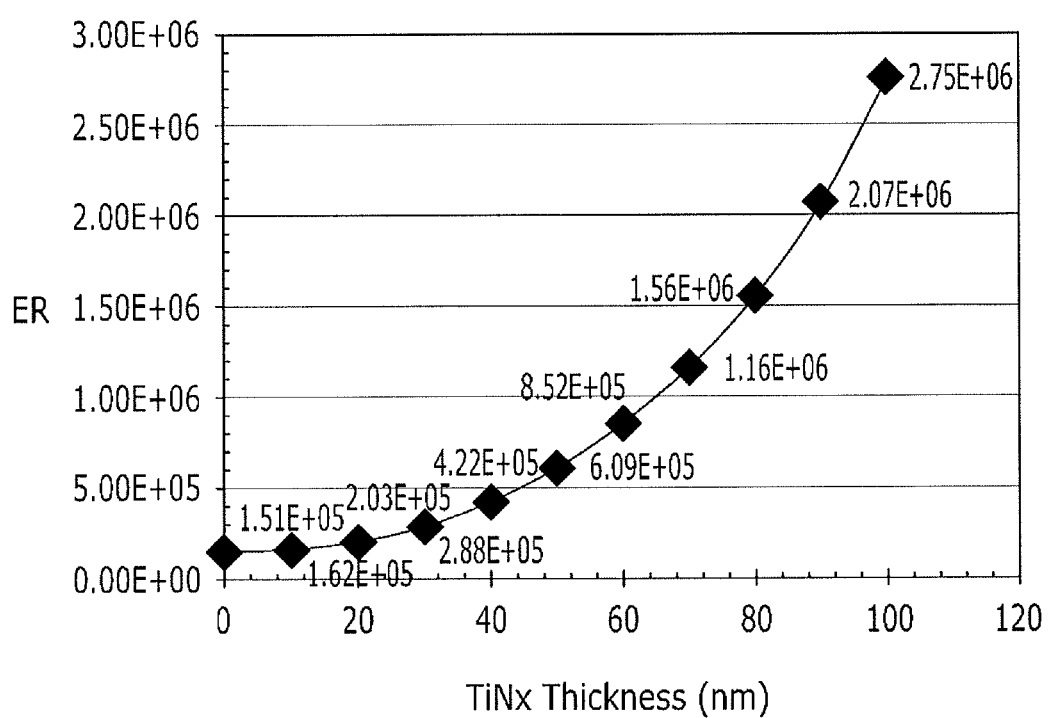

FIGS. 3 and 4 illustrate ER values according to heights of the metal line 211 and the low reflection layer 212, respectively. The ER value refers to a value of "transmittance of light of a penetrated polarization direction/transmittance of light of a blocked polarization direction of FIG. 6.

In an implementation, the ER may be equal to or larger than 100,000, in order to allow the display device to have a CR value of about 10,000. To this end, referring to FIG. 3, the height of the metal line 211 formed of Al may have a value equal to or larger than 150 nm and equal to or smaller than 200 nm, e.g., may be about 150 nm to about 200 nm.

In an implementation, the ER value may be equal to or larger than 100,000 by forming the metal line of TiNx, and it may be identified that ER values are equal to or larger than 100,000 in most heights in FIG. 4.

Figure 5:
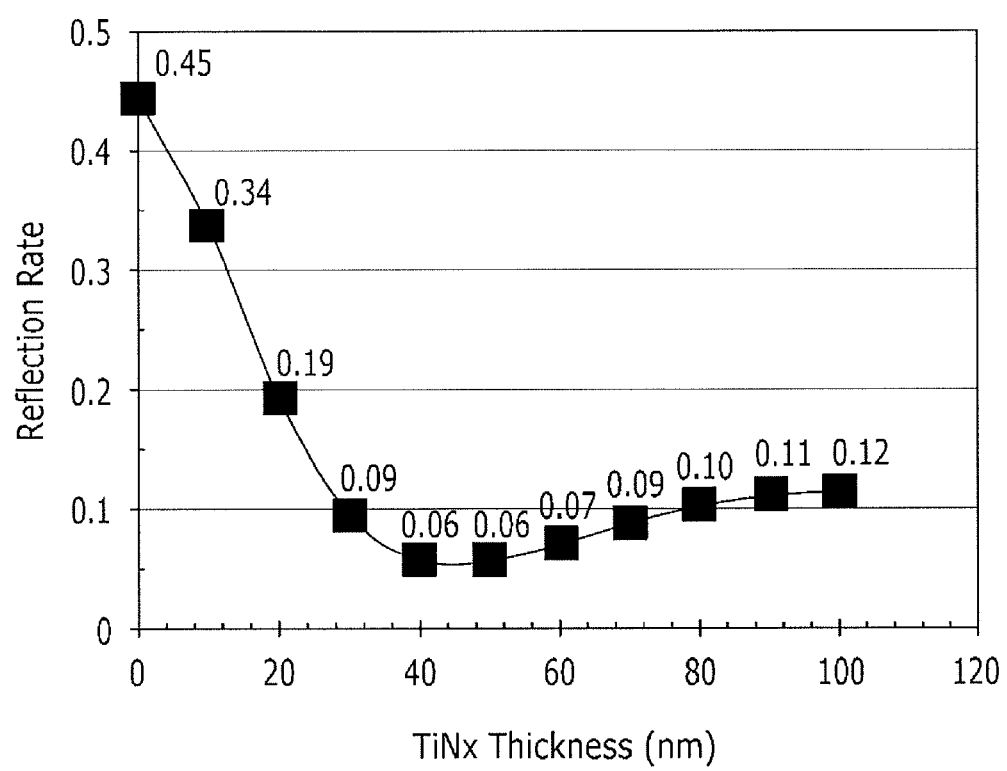

Meanwhile, FIG. 5 illustrates reflectivity according to a height of TiNx.

Referring to FIG. 5, a height of TiNx to make reflectivity be 10% (0.1 in FIG. 5) or smaller may be equal to or larger than 40 nm and equal to or smaller than 70 nm, e.g., may be about 40 nm to about 70 nm.

Accordingly, a height of the low reflection layer 212 may have a value equal to or larger than 40 nm and equal to or smaller than 70 nm, e.g., may be about 40 nm to about 70 nm, to allow the upper polarizer 21 to have a low reflection characteristic.

The values of FIGS. 3 to 5 are illustrated by values in a table of FIG. 6

In FIG. 6, TE is a polarization direction blocked by the upper polarizer 21, TM is a penetrated polarization direction, SumR is reflectivity, and SumT is transmittance. Here, ER is a value of SumT in SumT/TE of TM.

Figure 7:
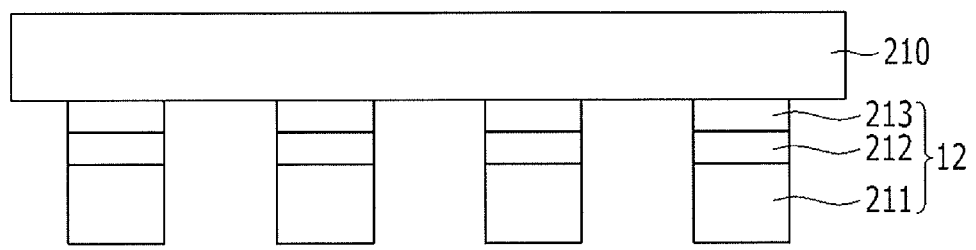
FIG. 7 illustrates an enlarged cross-sectional view of a polarizer according to another exemplary embodiment.

Hereinafter, a structure according to another exemplary embodiment will be described based on FIG. 7. FIG. 7 illustrates an enlarged cross-sectional view of the polarizer according to another exemplary embodiment.

For example, FIG. 7 shows a structure including two low reflection layers 212 and 213, different from the structure of FIG. 2.

The upper polarizer 21 may be formed under the upper insulation substrate 210 (made of a transparent glass or plastic).

The upper polarizer 21 may be a reflective polarizer, may include the plurality of metal lines 211 and the two low reflection layers 212 and 213 deposited and located on each of the metal lines 211, and may reduce reflectivity of light passing through the upper insulation substrate 210 and incident from the outside to about 10% or smaller.

The plurality of metal lines 211 may extend in one direction and may be separated from each other at regular intervals. The interval of the metal lines 211 may be smaller than a wavelength of a visible ray, e.g., the interval may have a width of tens to hundreds of nm. The width of the metal line 211 may vary, and may have a value corresponding to an interval between the metal lines 211 in the present exemplary embodiment. A height of the metal line 211 may vary depending on a material forming the metal line 211. The height of the metal line 211 may be, e.g., tens to hundreds of nm. In an implementation, the height of the metal line 211 may be about triple the width of the metal line 211. The metal line 111 may include, e.g., aluminum (Al). As described above, when the plurality of metal lines 211 is arranged in one direction, the metal lines 211 may transmit the light perpendicular to the arrangement direction and may reflect the light parallel to the arrangement direction. In an implementation, the width of the metal line 211 may be about 50 nm, the interval may be about 50 nm, and the height may be about 150 nm. The height of the metal line 211 may be equal to or larger than 150 nm and equal to or smaller than 200 nm, e.g., may be about 150 nm to about 200 nm. When the plurality of metal lines 211 are arranged in one direction, the metal lines 211 may transmit light perpendicular to the direction and reflect light parallel to the direction.

The two low reflection layers 212 and 213 may be deposited on each of the plurality of metal lines 211. The two low reflection layers 212 and 213 contact an upper part of one, e.g., respective, metal line 211 and have the same width and interval as those of the metal line 211. A height of each of the low reflection layers 212 and 213 may vary depending on a material used to form the low reflection layers 212 and 213. A width of the low reflection layers 212 and 213 according to an exemplary embodiment may be about 50 nm, and an interval may be about 50 nm.

The two low reflection layers 212 and 213 may contact only upper parts of the respective metal lines 211, and may not be formed on side surfaces of the metal lines 211. Accordingly, at least one of the two low reflection layers 212 and 213 may not cover both the side surface and the upper part of the metal line 211. Thus, a deterioration in an effect of reflection polarization performed by the metal lines 211 may be avoided.

Parts or regions between the plurality of metal lines 211 and between the plurality of row reflection layers 212 and 213 may be filled with air, or may be filled with a transparent material having a refractive index similar to that of air according to an exemplary embodiment.

The plurality of metal lines 211 and the plurality of low reflection layers 212 and 213 may directly contact the upper insulation substrate 210 and a layer under the metal lines 211 and the low reflection layers 212 and 213. For example, the plurality of metal lines 211 and the plurality of low reflection layers 212 and 213 may not be adhered to an adjacent substrate or layer through the use of separate resin, thereby reducing optical loss.

The first low reflection layers 212 may contact upper surfaces of the plurality of metal lines 211, and the second low reflection layers 213 may contact upper surfaces of the first low reflection layers 212.

The first low reflection layer 212 and the second low reflection layer 213 may have a same width and interval as those of the metal line 211.

The first low reflection layer 212 and the second low reflection layer 213 may be formed of various materials. A height of each of the layers may be changed according to the various materials. In an implementation, the height may make reflectivity of the upper polarizer 21 be about 10% or smaller.

In an implementation, the first low reflection layer 212 and the second low reflection layer 213 may include a different nitride or metal nitride. Examples of the nitride or metal nitride may include AlNx, TiNx, SiNx, CuNx, MoNx, and the like.

Hereinafter, a height of the low reflection layer 213 will be described with reference to FIGS. 8 to 11, in which TiNx was used for the first low reflection layer 212 and CuNx was used for the second low reflection layer 213.

When Al was used for the metal line 211, the upper polarizer 21 had a reflectivity of about 45%. However, the reflectivity of the upper polarizer 21 may be reduced to 10% or smaller by forming the low reflection layers 212 and 213 with two layers of nitride or metal nitride (see FIG. 29).

Figure 8:
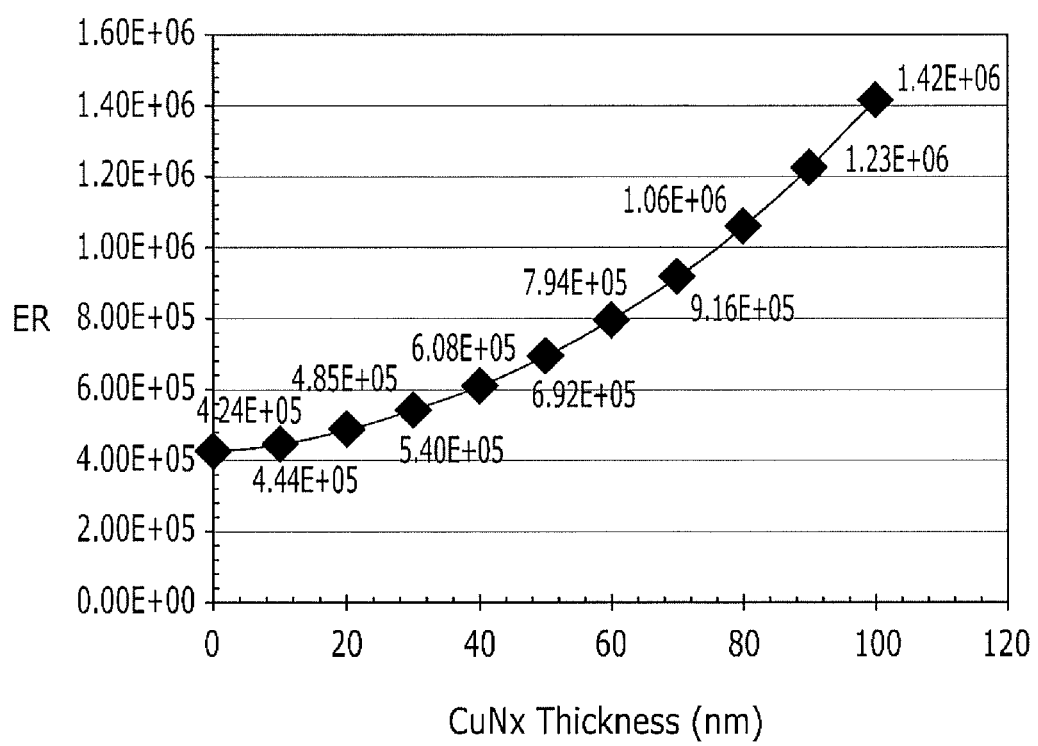

FIG. 8 illustrates ER values according to heights of a CuNx layer. The ER may have a value equal to or larger than 100,000, and it may be identified that all heights have corresponding ER values.

Figure 9:
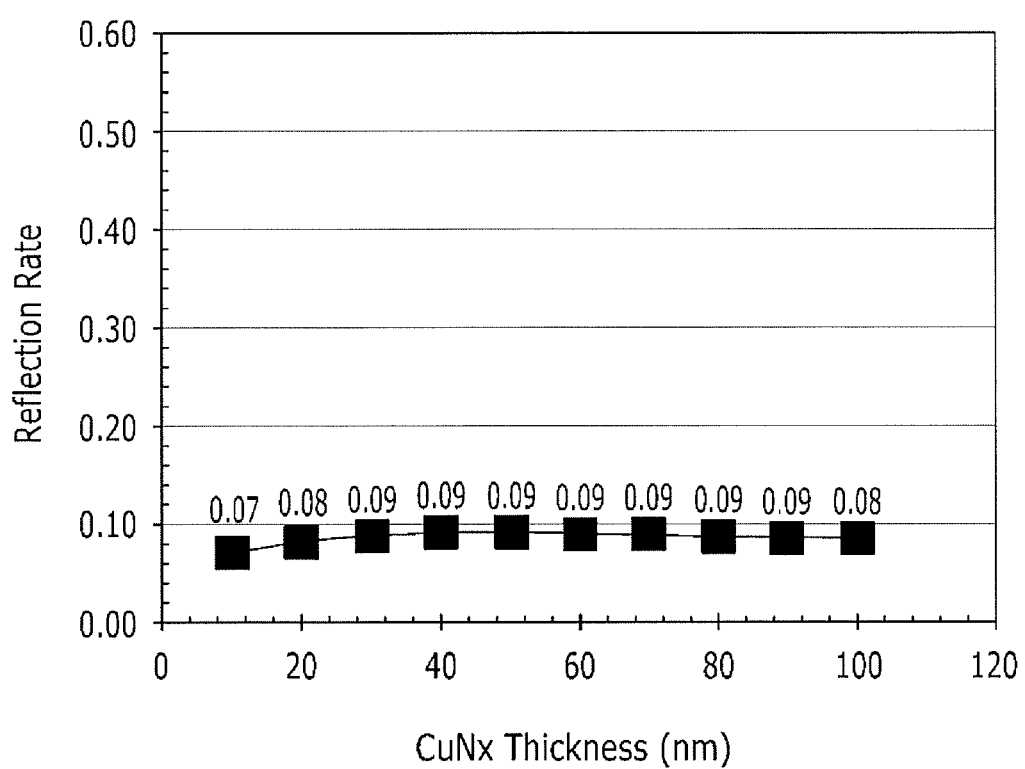

FIG. 9 illustrates a graph showing reflectivity according to heights of a CuNx layer. It may be seen that all heights may be used due to the reflectivity being equal to or smaller than 10% (0.1 of FIG. 9) in all areas.

The data of FIGS. 8 and 9 as described above was obtained under the same experimental conditions as those of FIG. 10, and the corresponding conditions were as follows.

In an exemplary embodiment in which the metal lines 211 were formed of Al, the first low reflection layer 212 was formed of TiNx, and the second low reflection layer 213 was formed of CuNx, an experiment was performed for a wavelength of 550 nm when a period (sum of the width and the interval) of the metal line 211 and the low reflection layers 212 and 213 was 100 nm, a height of the metal line 211 was 150 nm, and a height of the first low reflection layer 212 of TiNx was 40 nm.

As described above, when the second low reflection layer 213 of CuNx was foinied on a structure in which the first low reflection layer 212 of TiNx was formed on the metal line 211 of Al, it may be seen that CuNx (used for the second low reflection layer) had reflectivity equal to or smaller than 10%, regardless of the height thereof.

Hereinafter, the height of the first low reflection layer 212 of TiNx will be described, based on the height of the second low reflection layer 213 of CuNx determined as 10 nm with reference to FIG. 11.

As illustrated in FIG. 11, it may be seen that reflectivity equal to or smaller than 10% (0.1) corresponded to a value equal to or larger than 40 nm and equal to or smaller than 70 nm, e.g., of about 40 nm to about 70 nm. The height of the second low reflection layer 213 may vary (equal to or larger than 10 nm and equal to or smaller than 100 nm), and may have a value of 10 nm in one exemplary embodiment. The height of the metal line 211 was 150 nm. In an implementation, the height of the metal line 211 may be equal to or larger than 150 nm and equal to or smaller than 200 nm, e.g., about 150 nm to about 200 nm.

Figure 12:
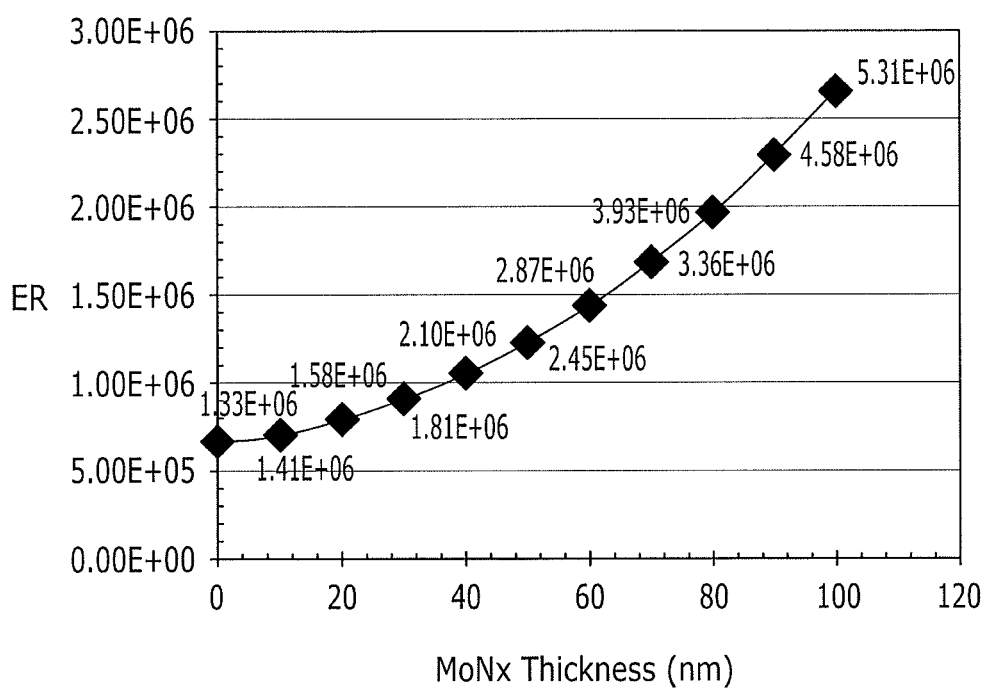
Figure 13:
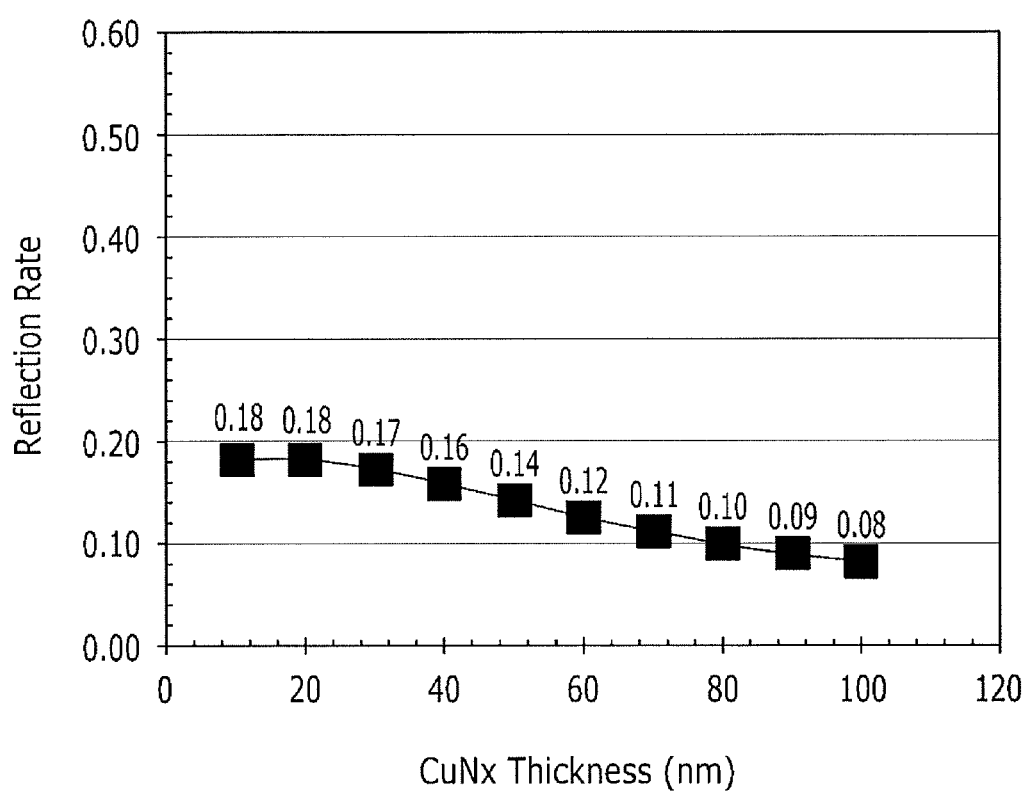

FIGS. 12 to 14 illustrate graphs showing experimental data of an exemplary embodiment of the two low reflection layers 212 and 213 formed of metal nitride in which the second low reflection layer 213 included CuNx and the first low reflection layer 212 included MoNx.

First, FIG. 12 illustrates a graph of ER with respect to a height of MoNx. In an implementation, the ER value may equal to or larger than 100,000. It may be seen that the ER had a value equal to or larger than 100,000 with respect to all heights of MoNx.

FIG. 13 illustrates reflectivity of the upper polarizer according to a height of CuNx. It may be seen that a height of CuNx having reflectivity equal to or smaller than 10% had a value equal to or larger than 80 nm.

FIG. 14 illustrates values according to the height of CuNx, based on a height of MoNx being fixed at 50 nm. Experiment conditions of FIG. 14 were as follows.

In an example in which the metal lines 211 were formed of Al, the first low reflection layer 212 was formed of MoNx, and the second low reflection layer 213 was formed of CuNx, an experiment was performed for a wavelength of 550 nm when a period (sum of the width and the interval) of the metal line 211 and the low reflection layers 212 and 213 was 100 nm, a height of the metal line 211 was 150 nm, and a height of the first low reflection layer 212 of MoNx was 50 nm.

In FIG. 14, reflectivity equal to or smaller than 10% corresponds to examples in which the second low reflection layer 213 of CuNx had a height equal to or larger than 80 nm and equal to or smaller than 100 nm, e.g., about 80 nm to about 100 nm. Although the upper limit was determined as 100 nm, the experiment was not performed for heights larger than 100 nm. Thus, heights larger than 100 nm may have reflectivity equal to or smaller than 10%, and the second low reflection layer 213 may be actually formed to have a height equal to or larger than 100 nm.

It may be seen in FIG. 14 that the reflectivity has a value of about 10.5% when the second low reflection layer 213 of CuNx was 80 nm. Accordingly, the reflectivity exceeded 10%. However, in consideration of a slight error, it is determined as the height suitable for the reflectivity of about 10% when the upper polarizer 21 is formed.

When the second low reflection layer 213 of CuNx and the first low reflection layer 212 of MoNx are used, CuNx may have a height equal to or larger than about 80 nm and equal to or smaller than about 100 nm, MoNx may have a height (e.g., about 30 nm or about 50 nm) equal to or larger than about 10 nm and equal to or smaller than about 100 nm. The metal line of Al may have a height equal to or larger than 150 nm and equal to or smaller than 200 nm, e.g., about 150 nm to about 200 nm.

Hereinafter, a case in which a transparent conductive material is used for the first low reflection layer 212 and a metal is used for the second low reflection layer 213 will be described with reference to FIGS. 15 to 20.

Examples of the transparent conductive material (e.g., transparent conductive oxide: TCO) may include gallium-doped zinc oxide (GZO), indium zinc oxide (IZO), indium-tin oxide (ITO), aluminum doped zinc oxide (AZO), and the like. The metal used for the second low reflection layer 213 may include, e.g., titanium (Ti) or the like.

In the experiment, IZO was used for the first low reflection layer 212 and Ti was used for the second low reflection layer 213.

Figure 15:
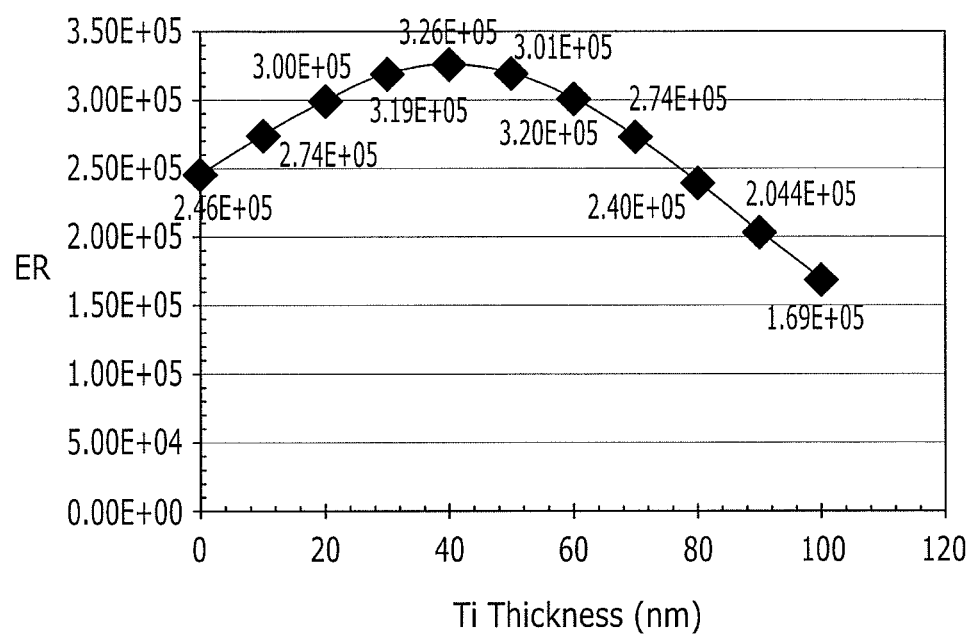

Referring to FIG. 15, a change in ER according to a change in a height of Ti is illustrated. ER values equal to or larger than 100,000 corresponded to all heights of Ti, it may be seen that sufficient CR may be secured if Ti is formed, regardless of the height.

Figure 16:
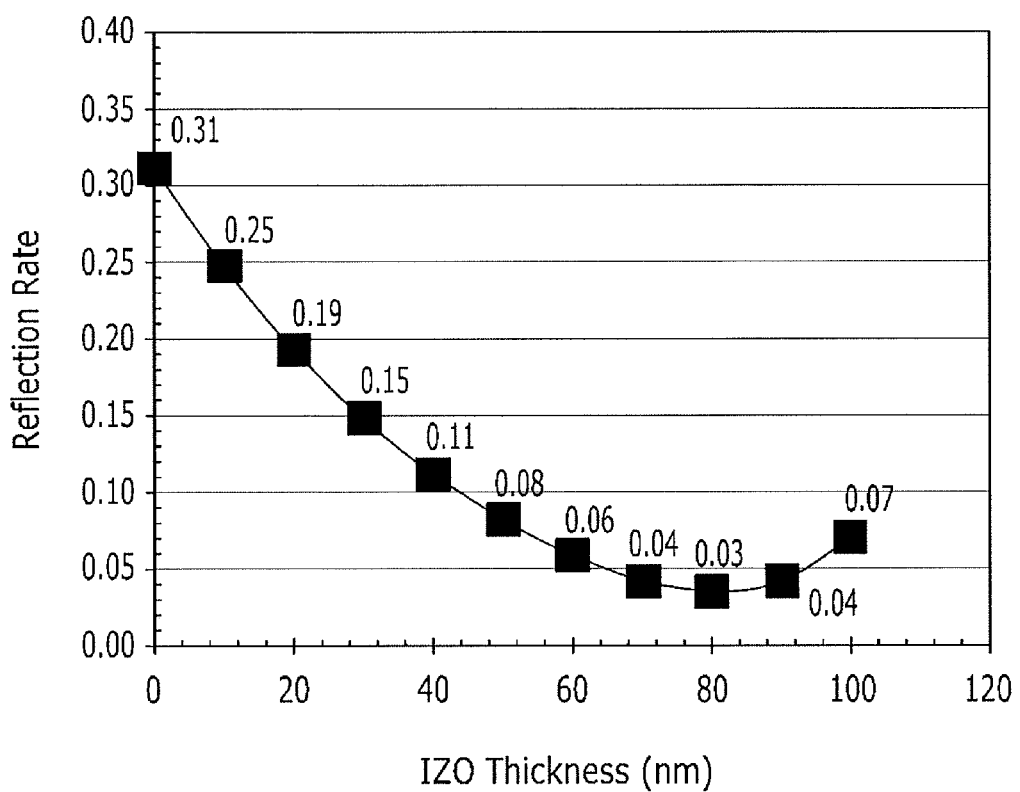

FIGS. 16 and 17 illustrate results of an experiment under the following conditions. (See FIG. 17)

In an example in which the metal line 211 was formed of Al, the first low reflection layer 212 was formed of IZO, and the second low reflection layer 213 was formed of Ti, an experiment was performed at a wavelength of 550 nm when a period (sum of the width and the interval) of the metal line 211 and the low reflection layers 212 and 213 was 100 nm, a height of the metal line 211 was 150 nm, and a height of the second low reflection layer 213 of Ti was 20 nm.

Reflectivity of the upper polarizer 21 according to the height of IZO is illustrated in FIG. 16.

Based on FIGS. 16 and 17, it may be seen that the upper polarizer 21 had reflectivity equal to or smaller than 10% when the height of IZO had a value equal to or larger than 50 nm and equal to or smaller than 100 nm, e.g., about 50 nm to about 100 nm.

Therefore, in an exemplary embodiment, Al of the metal line 211 may have a height equal to or larger than 150 nm and equal to or smaller than 200 nm, IZO of the first low reflection layer 212 may have a height equal to or larger than 50 nm and equal to or smaller than 100 nm, and Ti of the second low reflection layer 213 may have a height equal to or larger than 10 nm and equal to or smaller than 40 nm.

The IZO used in the experiments corresponding to FIGS. 15 to 17 had an indium content of 70%. Characteristics of IZO may change according to the indium content. Hereinafter, results of experiments in which IZO having an indium content of 10% was used are illustrated in FIGS. 18 to 20.

Figure 18:
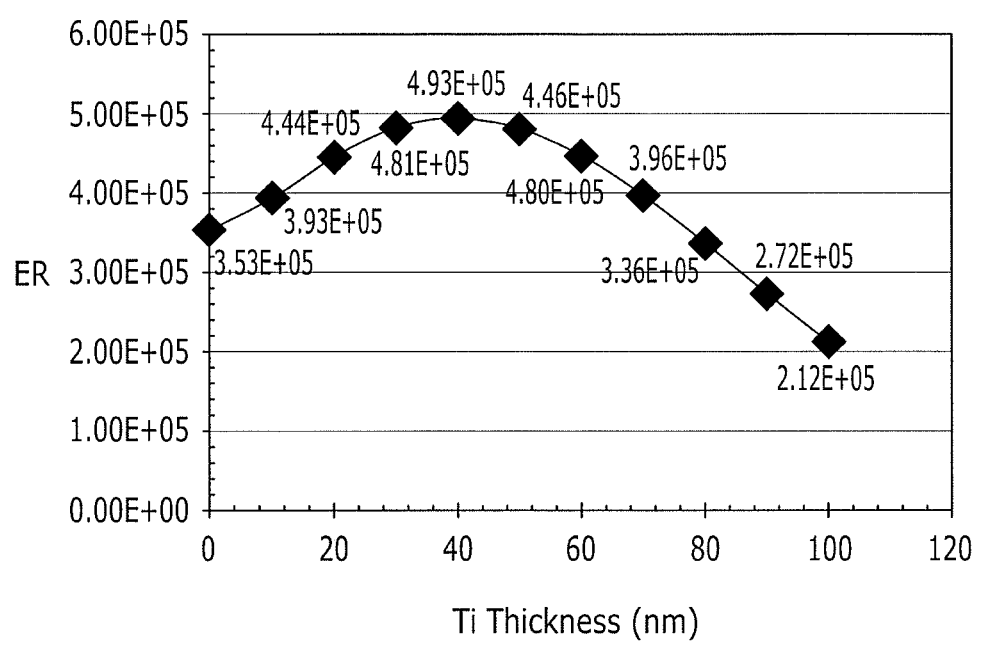

Referring to FIG. 18, although having differences from FIG. 15, it may be seen that ER was totally 100,000 or larger with respect to various heights of Ti.

Figure 19:
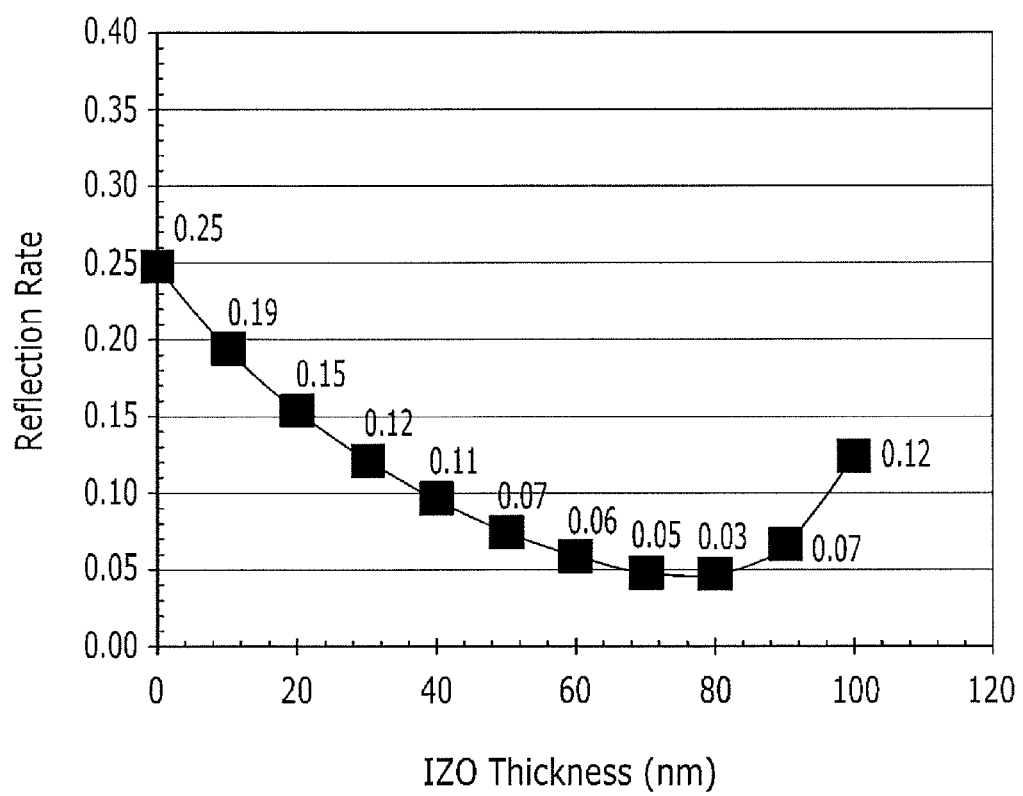

Meanwhile, FIGS. 19 and 20 illustrate results of experiments conducted under the following conditions. (See FIG. 20)

In an example in which the metal line 211 was formed of Al, the first low reflection layer 212 was formed of IZO, and the second low reflection layer 213 was formed of Ti, an experiment was performed at a wavelength of 550 nm when a period (sum of the width and the interval) of the metal line 211 and the low reflection layers 212 and 213 was 100 nm, a height of the metal line 211 was 150 nm, and a height of the second low reflection layer 213 of Ti was 30 nm.

A graph showing the reflectivity of the upper polarizer 21 according to the height of IZO is shown in FIG. 19.

Based on FIGS. 19 and 20, it may be seen that the upper polarizer 21 had reflectivity equal to or smaller than 10% when the height of IZO was equal to or larger than 50 nm and equal to or smaller than 100 nm, e.g., from about 50 nm to about 100 nm.

Referring to FIGS. 15 to 20, although a characteristic change was generated according to the indium content of IZO, it may be seen that there was no significant difference.

Therefore, in an exemplary embodiment, Al of the metal line 211 may have a height equal to or larger than about 150 nm and equal to or smaller than about 200 nm, IZO of the first low reflection layer 212 may have a height equal to or larger than about 50 nm and equal to or smaller than about 100 nm, and Ti of the second low reflection layer 213 have a height (e.g., about 30 nm) equal to or larger than about 10 nm and equal to or smaller than about 40 nm.

Hereinafter, an example in which an oxide or metal oxide was used for the first low reflection layer 212 and a metal as used for the second low reflection layer 213 will be described with reference to FIGS. 21 to 26.

Examples of the oxide or metal oxide may include AlOx, TiOx, MoOx, CuOx, SiOx, and the like. The metal used for the second low reflection layer 213 may include, e.g., titanium (Ti) or the like.

In the experiment, TiOx was used for the first low reflection layer 212 and Ti was used for the second low reflection layer 213.

Figure 21:
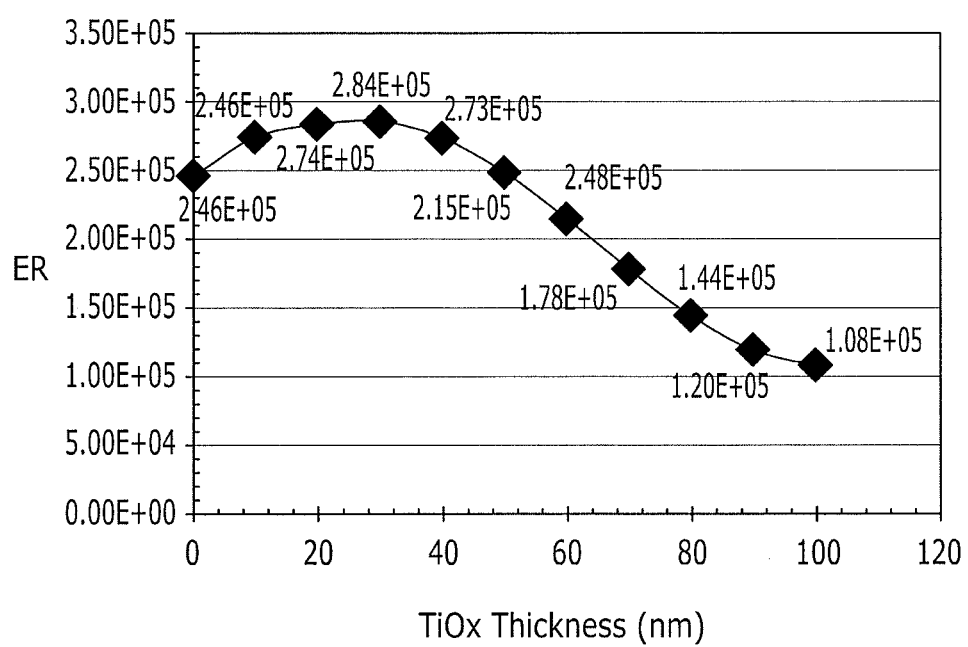

Referring to FIG. 21, a change in ER according to a change in a height of TiOx is illustrated. ER values equal to or larger than 100,000 corresponded to all heights of Ti equal to or smaller than 100 nm, it may be seen that sufficient CR was secured when TiOx was formed, regardless of the height.

Figure 22:
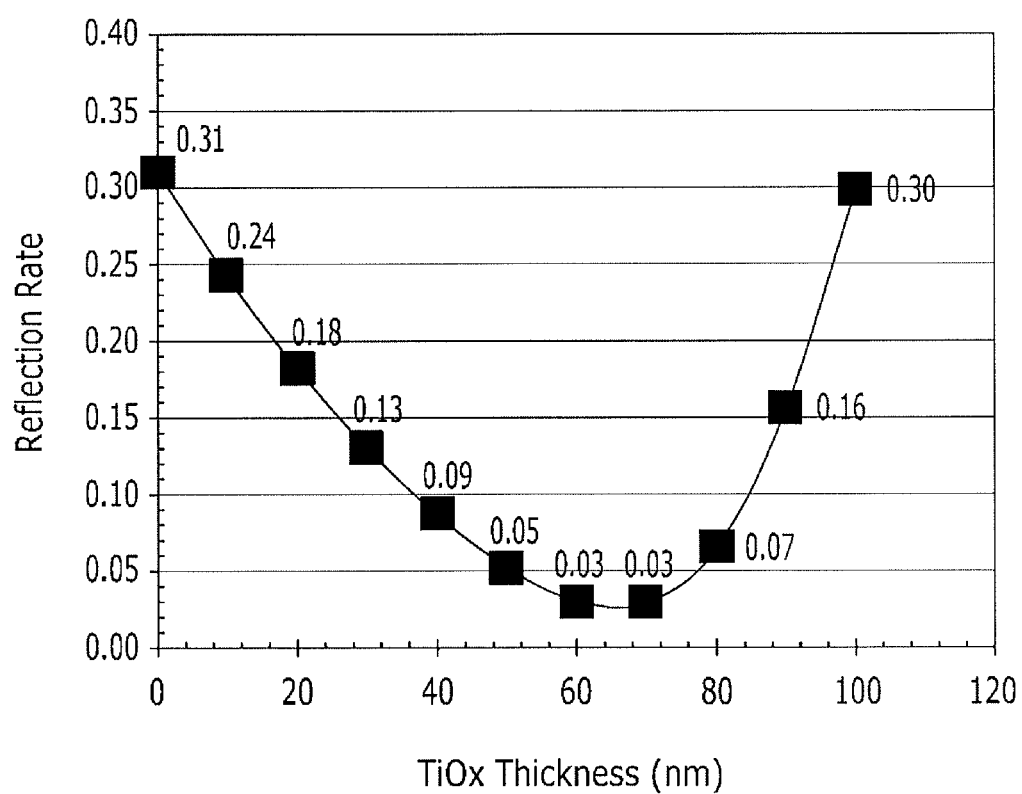

FIGS. 22 and 23 illustrate experimental results under the following conditions. (See FIG. 23)

In an example in which the metal line 211 was formed of Al, the first low reflection layer 212 was formed of TiOx, and the second low reflection layer 213 was formed of Ti, an experiment was performed at a wavelength of 550 nm when a period (sum of the width and the interval) of the metal line 211 and the low reflection layers 212 and 213 was 100 nm, a height of the metal line 211 was 150 nm, and a height of the second low reflection layer 213 of Ti was 20 nm.

A graph showing the reflectivity of the upper polarizer 21 according to the height of TiOx is illustrated in FIG. 22.

Based on FIGS. 22 and 23, it may be seen that the upper polarizer 21 had reflectivity equal to or smaller than 10% when the height of TiOx had a value equal to or larger than about 40 nm and equal to or smaller than about 80 nm, e.g., about 40 nm to about 80 nm.

Therefore, in an exemplary embodiment, Al of the metal line 211 may have a height equal to or larger than about 150 nm and equal to or smaller than about 200 nm, TiOx of the first low reflection layer 212 may have a height equal to or larger than about 40 nm and equal to or smaller than about 80 nm, and Ti of the second low reflection layer 213 may have a height of about 20 nm.

Hereinafter, an exemplary embodiment in which a height of Ti was 30 nm will be described with reference to FIGS. 24 to 26.

Figure 24:
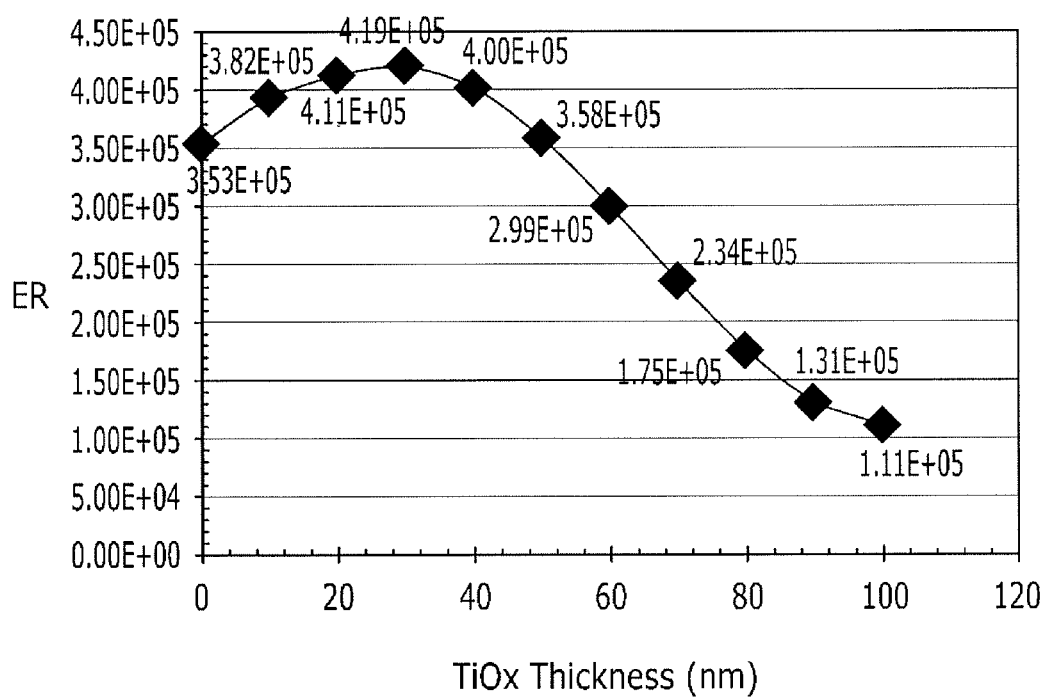

Referring to FIG. 24, FIG. 24 is almost similar to FIG. 21, in spite of a difference in material. ER values equal to or larger than 100,000 corresponded to all heights of Ti equal to or smaller than 100 nm. Thus, it may be seen that sufficient CR was secured when TiOx was formed, regardless of the height.

Figure 25:
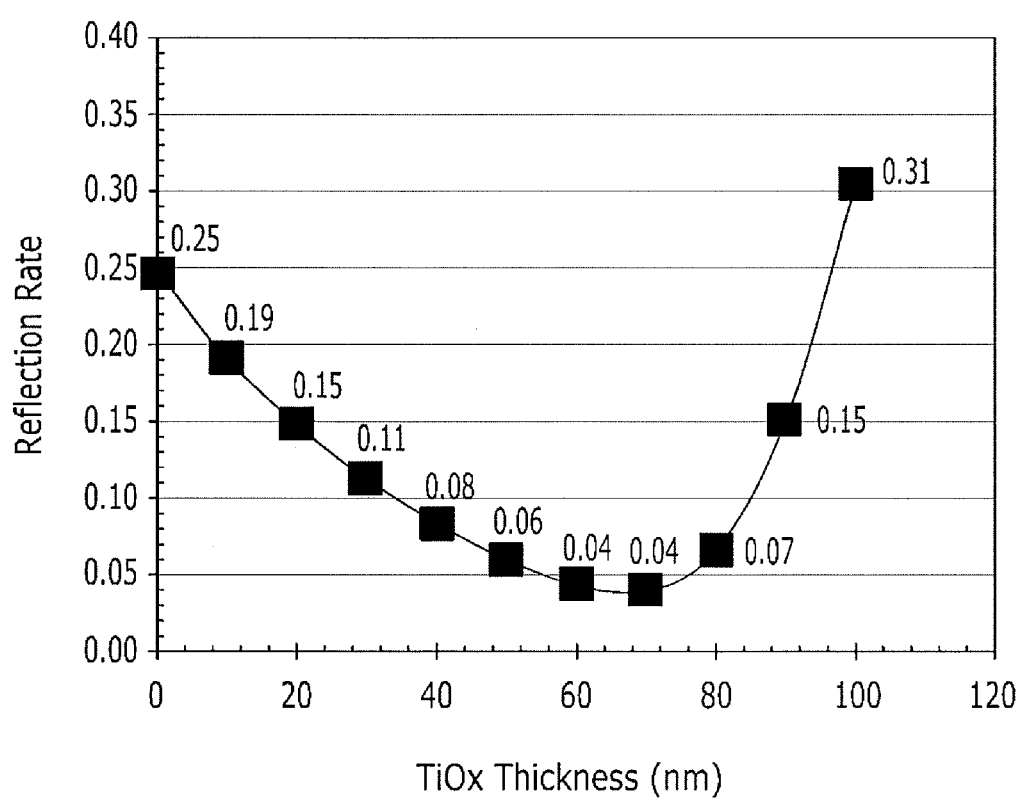

FIGS. 25 and 26 illustrate results experimented under the following conditions. (See FIG. 26)

In an example in which the metal line 211 was formed of Al, the first low reflection layer 212 was formed of TiOx, and the second low reflection layer 213 was formed of Ti, an experiment is performed at a wavelength of 550 nm when a period (sum of the width and the interval) of the metal line 211 and the low reflection layers 212 and 213 was 100 nm, a height of the metal line 211 was 150 nm, and a height of the second low reflection layer 213 of Ti was 30 nm.

A graph showing reflectivity of the upper polarizer 21 according to the height of TiOx is illustrated in FIG. 25.

Based on FIGS. 25 and 26, it may be seen that the upper polarizer 21 had reflectivity equal to or smaller than 10% when the height of TiOx has a value equal to or larger than about 40 nm and equal to or smaller than about 80 nm.

Referring to FIGS. 21 to 26, it may be seen that the upper polarizer 21 had reflectivity equal to or smaller than 10% when the height of TiOx was equal to or larger than about 40 nm and equal to or smaller than about 80 nm, regardless of the height of Ti.

Therefore, in an exemplary embodiment, Al of the metal line 211 may have a height equal to or larger than about 150 nm and equal to or smaller than about 200 nm, TiOx of the first low reflection layer 212 may have a height equal to or larger than about 40 nm and equal to or smaller than about 80 nm, and Ti of the second low reflection layer 213 may have a height equal to or larger than about 20 nm and equal to or smaller than about 40 nm.

In the above description, the experiment results are discussed based on the exemplary embodiments in which various low reflection layers were used.

FIGS. 27 and 28 illustrate materials that may be used for the low reflection layer and characteristics thereof. For example, FIGS. 27 and 28 illustrate examples of materials that may be used for the polarizer according to an exemplary embodiment and characteristics thereof.

Based on FIG. 27, oxide, metal oxide, nitride, metal nitride, a transparent conductive material (transparent conductive oxide (TCO), and/or a metal may be used for the low reflection layer, and a detailed material corresponding to each of the above materials is also illustrated.

Further, FIG. 28 illustrates values of refractive indexes (n, k) with respect to wavelengths for each material.

Referring to FIGS. 27 and 28, various materials may be used for the low reflection layer according to an exemplary embodiment. It may be seen that one reflection layer may be included as illustrated in FIG. 2 or two low reflection layers may be included as illustrated in FIG. 7.

In an implementation, three or more low reflection layers may be formed.

An exemplary embodiment features a structure including the above described low reflection layer(s) and also reflectivity equal to or smaller than 10%.

Figure 29:
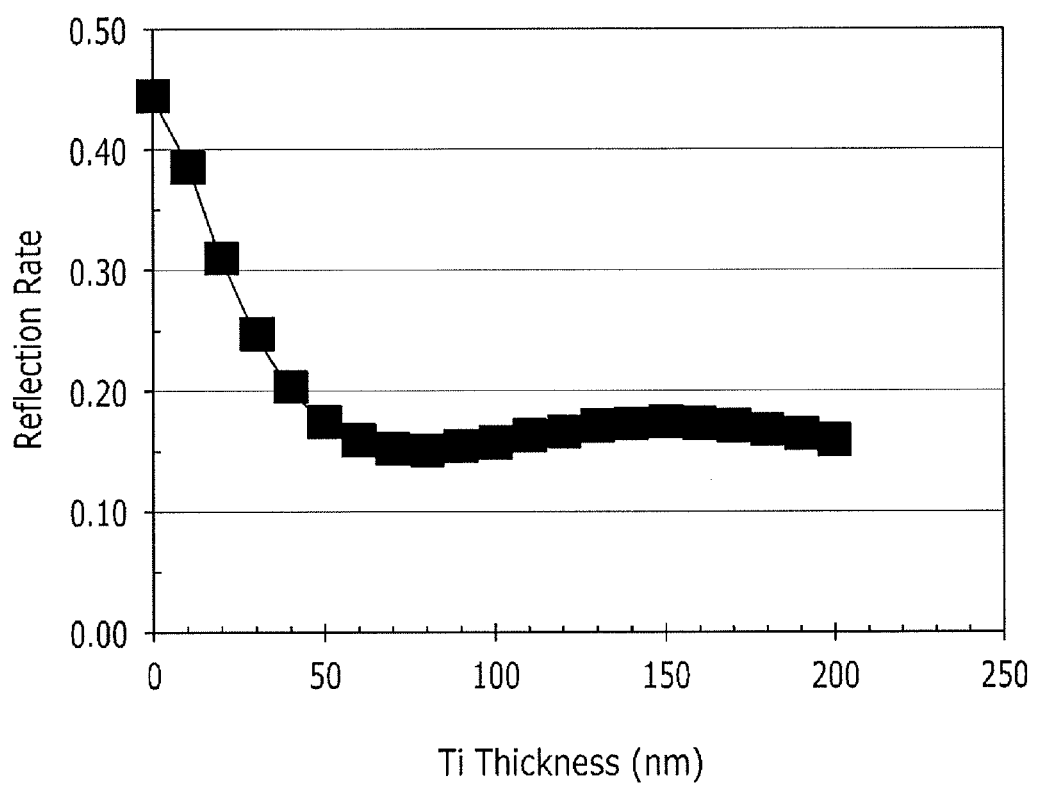
FIG. 29 illustrates a graph showing reflectivity according to a comparative example.

The feature will be described in comparison with a comparative example of FIG. 29. FIG. 29 illustrates a graph showing reflectivity of the comparative example.

The graph of FIG. 29 illustrates reflectivity according to a height of Ti in a structure where a metal of Ti was included in a metal line formed of Al. A part having the height of Ti of 0 was formed only of the metal line of Al and reflectivity was about 45%. Even though the height was changed by forming Ti on the metal line of Al, the reflectivity converged on a middle value between 10% and 20%. Accordingly, it may not be possible to acquire the reflectivity equal to or smaller than 10% as in the exemplary embodiment.

Hereinafter, a liquid crystal display according to another exemplary embodiment will be described with reference to FIG. 30. FIG. 30 illustrates a cross-sectional view of a liquid crystal display according to another exemplary embodiment.

Figure 30:
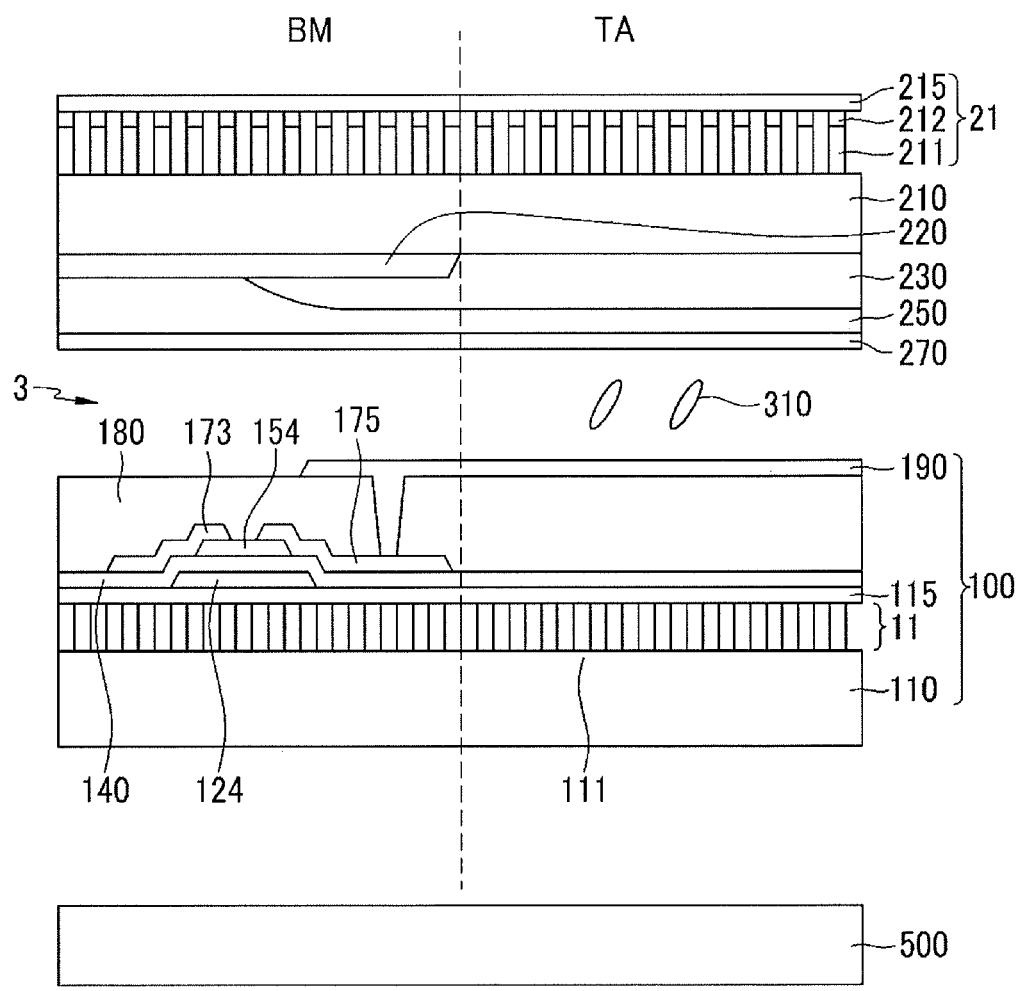
FIG. 30 illustrates a cross-sectional view of a liquid crystal display according to another exemplary embodiment.

FIG. 30 illustrates a liquid crystal display in an on cell type in which the upper polarizer 21 is located in an outer side of the upper insulation substrate 210, unlike the embodiment illustrated in FIG. 1.

Only differences of the upper polarizer 21 from that of FIG. 1 will be described below.

The upper polarizer 21 may be formed on the upper insulation substrate 210 (made of a transparent glass or plastic).

The upper polarizer 21 may be a reflective polarizer and may include the plurality of metal lines 211 and the plurality of low reflection layers 212 deposited and located on the respective metal lines 211.

The plurality of metal lines 211 may extend in one direction and may be separated from each other at or by regular intervals. The interval of the metal lines 211 may be smaller than a wavelength of a visible ray, e.g., may have a size or width of tens to hundreds of nm. A direction in which the plurality of metal lines 211 of the upper polarizer 21 extend and a direction in which the plurality of metal lines 111 of the lower polarizer 11 extends may be the same in an exemplary embodiment of FIG. 1. However, in an implementation, the directions may have an angle of 90 degrees or a different angle.

The width of the metal line 211 may vary, and may have a value corresponding to the interval between the metal lines 211 in the present exemplary embodiment. A height of the metal line 211 may be changed according to a material of the metal line 211, and may be tens to hundreds of nm. In an implementation, the height may be about triple the width of the metal line 211. In an implementation, the metal line 211 may include aluminum (Al). As described above, when the plurality of metal lines 211 is arranged in one direction, the metal lines 211 may transmit the light perpendicular to the arrangement direction and reflect the light parallel to the arrangement direction. In an implementation, the width of the metal line 211 may be about 50 nm, an interval may be about 50 nm, and the height may be about 150 nm. In an implementation, the height of the metal line 211 may be equal to or larger than about 150 nm and equal to or smaller than about 200 nm, e.g., about 150 nm to about 200 nm. When the plurality of metal lines 211 is arranged in one direction, light perpendicular to the direction may be penetrated and light parallel to the direction may be reflected.

The low reflection layer 212 may be deposited on each of the plurality of metal lines 211. The low reflection layer 212 may contact an upper part of one, e.g., respective, metal line 211 and may have the same width and interval as those of the metal line 211. A height of the low reflection layer 212 may vary depending on a material used to form the low reflection layer 212. The low reflection layer 212 may contact only the upper part of the metal line 211, and may not be formed on a side surface of the metal line 211, so that the low reflection layer 212 may not cover both the side surface and the upper part of the metal line 211. Accordingly, a deterioration in an effect of reflection polarization performed by the metal line 211 may be avoided.

The opposing insulating layer 215 may be formed on the plurality of low reflection layers 212. The opposing insulating layer 215 may be a layer for protecting the low reflection layer 212 from the outside and supporting the low reflection layer 212, and may be formed of a film.

Parts or regions between the plurality of metal lines 211 and between the plurality of low reflection layers 212 may be filled with air, or may be filled with a transparent material having a refractive index similar to that of air according to an exemplary embodiment.

The plurality of metal lines 211 and the plurality of low reflection layers 212 may directly contact the upper insulation substrate 210 and the opposing insulating layer 215. For example, the plurality of metal lines 211 and the plurality of low reflection layers 212 may not be adhered through the use of a separate resin, thereby reducing optical loss due to a resin layer.

A number of low reflection layers 212 of the upper polarizer 21 used in an exemplary embodiment of FIG. 30 also may be two or more.

By way of summation and review, the liquid crystal display may display an image by using a backlight located at a rear surface of a liquid crystal cell according to a light source. When outside or ambient light is bright, a user may have a difficulty in recognizing an image displayed by the liquid crystal display. For example, the liquid crystal display may reflect external light.

The embodiments provide a polarizer used in an upper part of a liquid crystal display.

The embodiments provide a polarizer having a low reflection characteristic.

According to an embodiment, on a polarizer including a metal line, a single low reflection layer or two or more low reflection layers may be additionally formed on a part of the metal line receiving external light, so that the polarizer may have a low reflection characteristic. As a result, light efficiency may be increased by reflecting and polarizing light through the metal line, and a user may easily view an image due to the low reflection characteristic.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A polarizer, comprising:
a plurality of metal lines each extending in one direction and being arranged at regular intervals; and
a plurality of low reflection layers on the plurality of metal lines, the plurality of low reflection layers contacting respective upper parts of the plurality of metal lines and having an interval and a width about equal to an interval and a width of the plurality of metal lines, wherein:
the interval of the plurality of metal lines is smaller than a wavelength of a visible ray,
light incident from an upper side of the plurality of low reflection layers is reflected with reflectivity equal to or smaller than 10%,
each low reflection layer of the plurality of low reflection layers is a dual layer of a first low reflection layer and a second low reflection layer,
the first low reflection layer contacts an upper part of the metal line and the second low reflection layer contacts an upper part of the first low reflection layer,
the first low reflection layer includes CuNx, MoNx, GZO, AZO, MoOx, or CuOx,
the second low reflection layer includes a metal, AlNx, TiNx, SiNx, CuNx, or MoNx, and
the material of the first low reflection layer is different from the material of the second low reflection layer.

2. The polarizer as claimed in claim 1, wherein:
the first low reflection layer includes CuNx or MoNx.

3. The polarizer as claimed in claim 2, wherein:
the metal lines include aluminum and have a height of about 150 nm to about 200 nm,
the first low reflection layer has a height of about 40 nm to about 70 nm, and
the second low reflection layer includes CuNx and has a height of about 10 nm to about 100 nm.

4. The polarizer as claimed in claim 2, wherein:
the metal lines include aluminum and have a height of about 150 nm to about 200 nm,
the first low reflection layer includes MoNx and has a height of about 10 nm to about 100 nm, and
the second low reflection layer includes CuNx and has a height of about 80 nm to about 100 nm.

5. The polarizer as claimed in claim 1, wherein:
the first low reflection layer includes GZO or AZO, and
the second low reflection layer includes the metal, the metal including Ti.

6. The polarizer as claimed in claim 5, wherein:
the metal lines include aluminum and have a height of about 150 nm to about 200 nm,
the first low reflection layer has a height of about 50 nm to about 100 nm, and
the second low reflection layer has a height of about 10 nm to about 40 nm.

7. The polarizer as claimed in claim 1, wherein:
the first low reflection layer includes MoOx or CuOx, and
the second low reflection layer includes the metal, the metal including Ti.

8. The polarizer as claimed in claim 7, wherein:
the metal lines include aluminum and have a height of about 150 nm to about 200 nm,
the first low reflection layer has a height of about 40 nm to about 80 nm, and
the second low reflection layer has a height of about 20 nm to about 40 nm.

9. A liquid crystal display, comprising:
a lower display panel including a lower insulation substrate and a lower polarizer attached to one side of the lower insulation substrate;
an upper display panel including an upper insulation substrate and an upper polarizer attached to one side of the upper insulation substrate; and
a liquid crystal layer between the upper display panel and the lower display panel, wherein:
the upper polarizer includes:
a plurality of metal lines extending in one direction and being arranged at regular intervals; and
a plurality of low reflection layers on the plurality of metal lines, the plurality of low reflection layers contacting respective upper parts of the plurality of metal lines and having an interval and a width equal to an interval and a width of the plurality of metal lines,
an interval of the plurality of metal lines is smaller than a wavelength of a visible ray,
light incident from an upper side of the plurality of low reflection layers is reflected with reflectivity equal to or smaller than 10%,
each low reflection layer of the plurality of low reflection layers is a dual layer of a first low reflection layer and a second low reflection layer,
the first low reflection layer contacts an upper part of the metal line and the second low reflection layer contacts an upper part of the first low reflection layer, layer,
the first low reflection layer includes CuNx, MoNx, GZO, AZO, MoOx, or CuOx,
the second low reflection layer includes a metal, AlNx, TiNx, SiNx, CuNx, or MoNx, and
the material of the first low reflection layer is different from the material of the second low reflection layer.

10. The liquid crystal display as claimed in claim 9, wherein:
the first low reflection layer includes CuNx or MoNx.

11. The liquid crystal display as claimed in claim 10, wherein:
the metal lines include aluminum and have a height of about 150 nm to about 200 nm,
the first low reflection layer has a height of about 40 nm to about 70 nm, and
the second low reflection layer includes CuNx and has a height of about 10 nm to about 100 nm.

12. The liquid crystal display as claimed in claim 10, wherein:
the metal lines include aluminum and have a height of about 150 nm to about 200 nm,
the first low reflection layer includes MoNx and has a height of about 10 nm to about 100 nm, and
the second low reflection layer includes CuNx and has a height of about 80 nm to about 100 nm.

13. The liquid crystal display as claimed in claim 9, wherein:
the first low reflection layer includes GZO or AZO, and
the second low reflection layer includes the metal, the metal including Ti.

14. The liquid crystal display as claimed in claim 13, wherein:
the metal lines include aluminum and have a height of about 150 nm to about 200 nm,
the first low reflection layer has a height of about 50 nm to about 100 nm, and
the second low reflection layer has a height of about 10 nm to about 40 nm.

15. The liquid crystal display as claimed in claim 9, wherein:
the first low reflection layer includes MoOx or CuOx, and
the second low reflection layer includes the metal, the metal including Ti.

16. The liquid crystal display as claimed in claim 15, wherein:
the metal line includes aluminum and has a height of about 150 nm to about 200 nm,
the first low reflection layer has a height of about 40 nm to about 80 nm, and
the second low reflection layer has a height of about 20 nm to about 40 nm.

17. The liquid crystal display as claimed in claim 9, wherein the lower polarizer includes a plurality of metal lines extending in one direction and being arranged at regular intervals.

* * * * *